(12) United States Patent
Cho et al.

(10) Patent No.: US 10,464,570 B2
(45) Date of Patent: Nov. 5, 2019

(54) ELECTRONIC DEVICE AND METHOD USING MACHINE LEARNING FOR IDENTIFYING CHARACTERISTICS OF USERS LOCATED WITHIN A SPECIFIC SPACE

(71) Applicant: LG ELECTRONICS INC., Seoul (KR)

(72) Inventors: Sungil Cho, Seoul (KR); Youngjun Kim, Seoul (KR); Yujune Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/702,302

(22) Filed: Sep. 12, 2017

(65) Prior Publication Data

US 2018/0257658 A1    Sep. 13, 2018

(30) Foreign Application Priority Data

Mar. 8, 2017    (KR) .......................... 10-2017-0029576

(51) Int. Cl.
| | |
|---|---|
| *B60W 40/08* | (2012.01) |
| *B60W 50/00* | (2006.01) |
| *G05B 13/02* | (2006.01) |
| *B60N 2/02* | (2006.01) |
| *H04L 29/08* | (2006.01) |
| *H04L 12/28* | (2006.01) |

(52) U.S. Cl.
CPC ........... *B60W 40/08* (2013.01); *B60N 2/0244* (2013.01); *B60W 50/00* (2013.01); *G05B 13/0265* (2013.01); *H04L 12/282* (2013.01); *H04L 67/22* (2013.01); *H04L 67/306* (2013.01); *B60W 2050/0089* (2013.01)

(58) Field of Classification Search
CPC ............... B60N 2/0244; B60N 2/0248; G05B 13/0265; H04L 12/282
See application file for complete search history.

(56) References Cited

U.S. PATENT DOCUMENTS

| | | | |
|---|---|---|---|
| 2008/0092064 A1* | 4/2008 | Zilca ....................... | G06F 3/011 |
| | | | 715/757 |
| 2009/0300174 A1* | 12/2009 | Floris ..................... | G06Q 10/06 |
| | | | 709/224 |

(Continued)

FOREIGN PATENT DOCUMENTS

WO    200039964    7/2000

OTHER PUBLICATIONS

European Patent Office Application Serial No. 18155041.9, Search Report dated Apr. 6, 2018, 12 pages.

(Continued)

*Primary Examiner* — Anne M Antonucci
*Assistant Examiner* — Renee LaRose
(74) *Attorney, Agent, or Firm* — Lee, Hong, Degerman, Kang & Waimey PC

(57) ABSTRACT

Electronic device using intelligent analysis for identifying characteristics of users located within a specific space. The electronic device includes a controller configured to identify each of a plurality of users located within a specific space, and generate a control command for controlling operation of at least one device associated with the specific space based on characteristic information related to each of the identified plurality of users.

16 Claims, 20 Drawing Sheets

(56) References Cited

U.S. PATENT DOCUMENTS

2016/0023664 A1   1/2016  Graham
2016/0179075 A1*  6/2016  Shin ........................ H04W 4/70
                                                     700/275
2016/0358065 A1* 12/2016  Gedge .................... G06N 3/006

OTHER PUBLICATIONS

European Patent Office Application Serial No. 18155041.9, Search Report dated Aug. 17, 2018, 15 pages.

* cited by examiner

CALL HISTORY ANALYSIS →

[CONFERENCE ROOM RESERVATION]

FIG. 6B(a)    FIG. 6B(b)
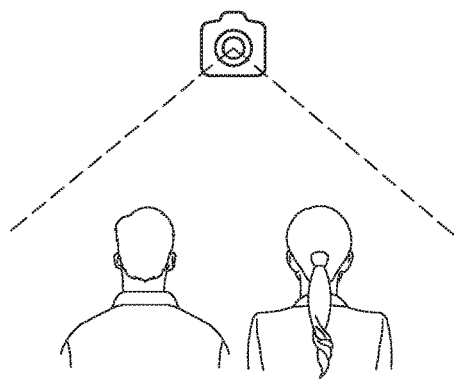
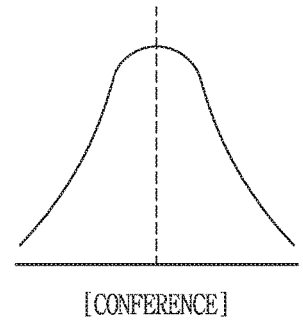
FIG. 6C
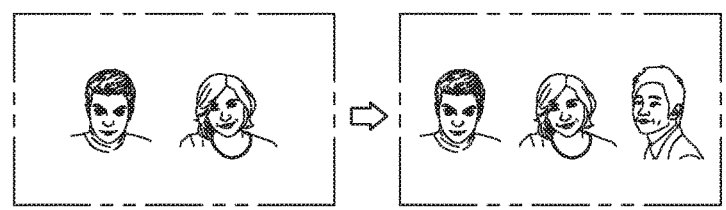
USE PURPOSE.  CONFERENCE  ———▶  CONFERENCE
USE PURPOSE.  CONFERENCE  ———▶  RELAXATION

| MEETING OF A, B, C, D | |
|---|---|
| DATE | MAR. 1, 2017 |
| TIME | 7:00 PM |
| PLACE | SECOND CONFERENCE ROOM |

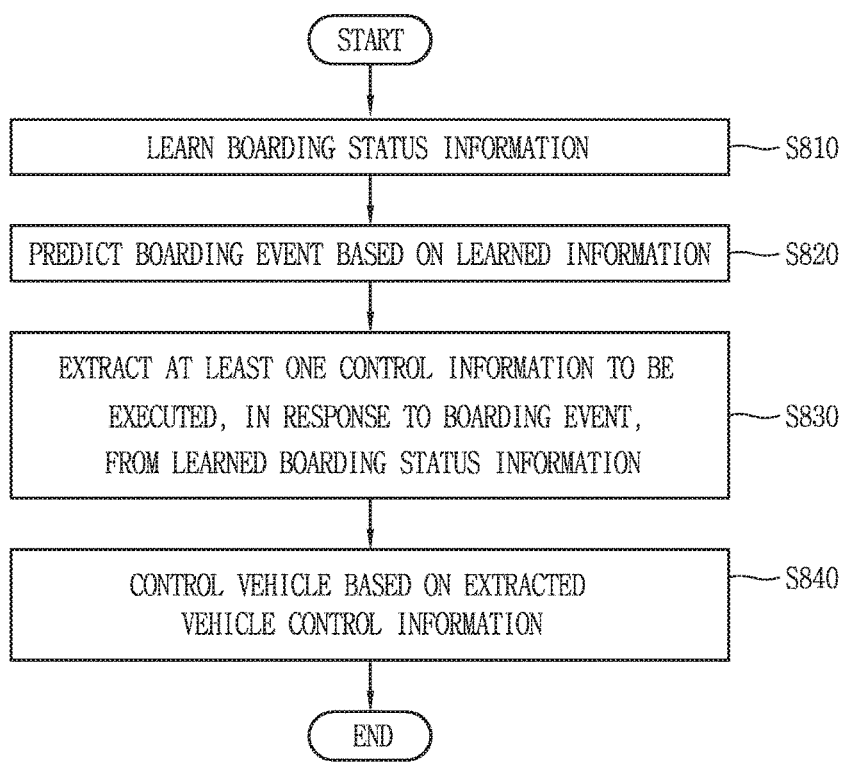

FIG. 13A(a)　　FIG. 13A(b)
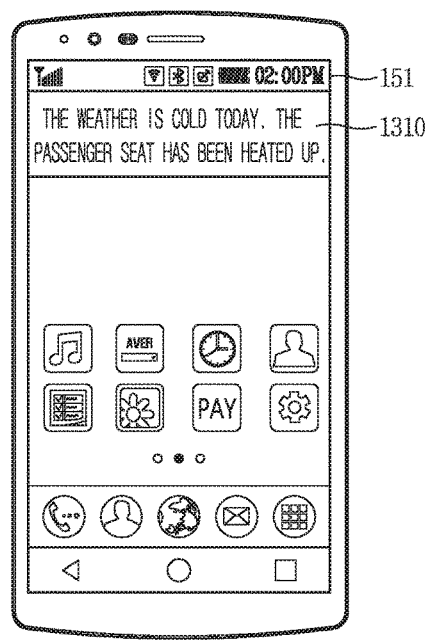
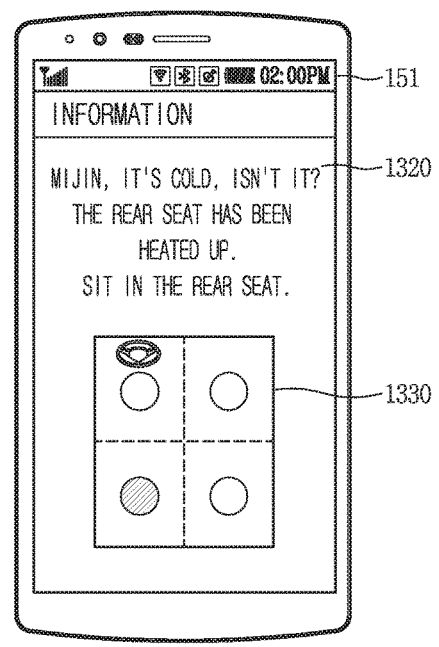

FIG. 14A(a)
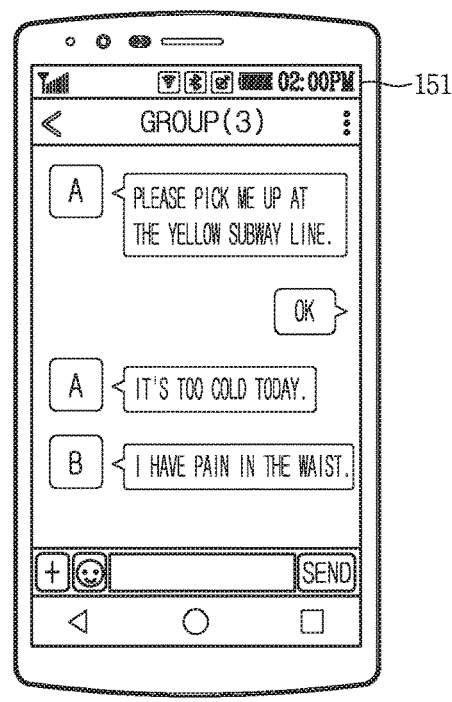
FIG. 14A(b)
| BOARDING EVENT | |
|---|---|
| PASSENGERS | ME, A, B |
| BOARDING TIME | 2:10 PM |
FIG. 14A(c)
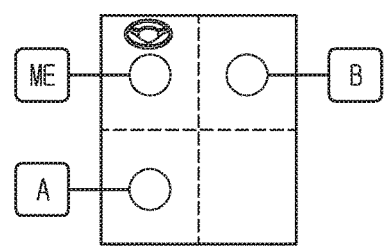

FIG. 14B(a)
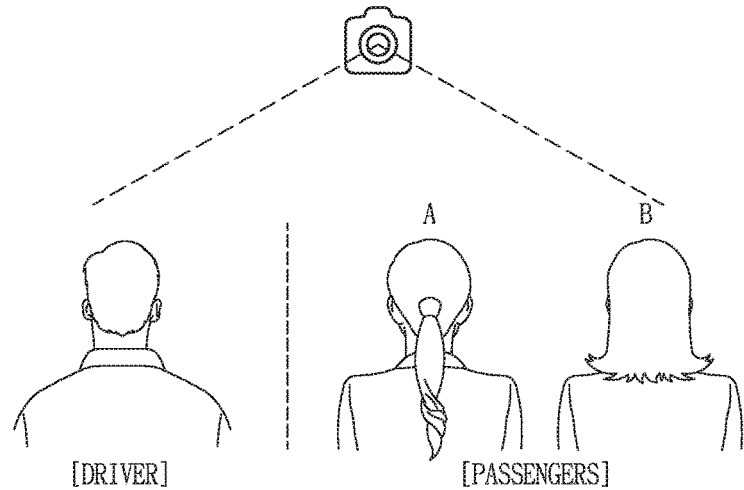
[DRIVER]   [PASSENGERS]
FIG. 14B(b)
| BOARDING EVENT | |
|---|---|
| PASSENGERS | ME, A, B |
| BOARDING TIME | Now |
FIG. 14B(c)
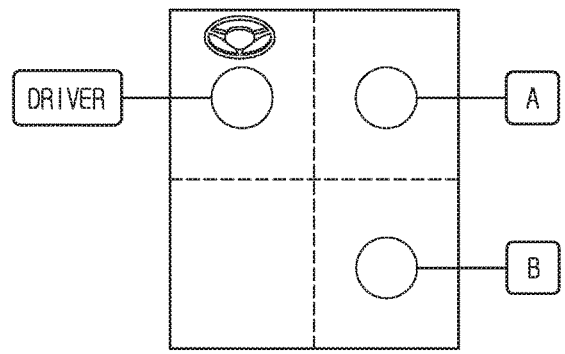

FIG. 16A(a)    FIG. 16A(b)
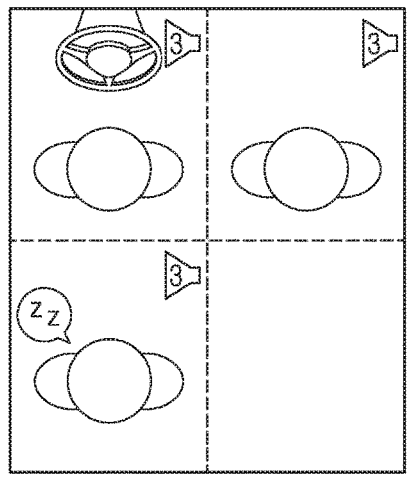 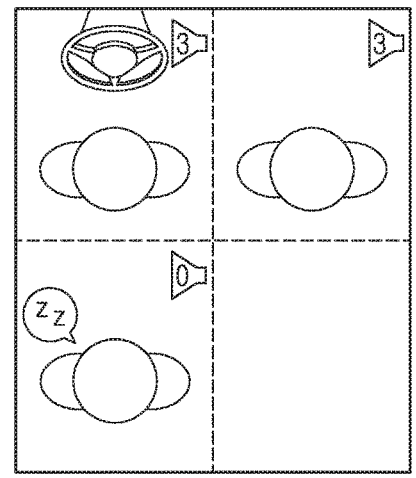
FIG. 16B(a)    FIG. 16B(b)
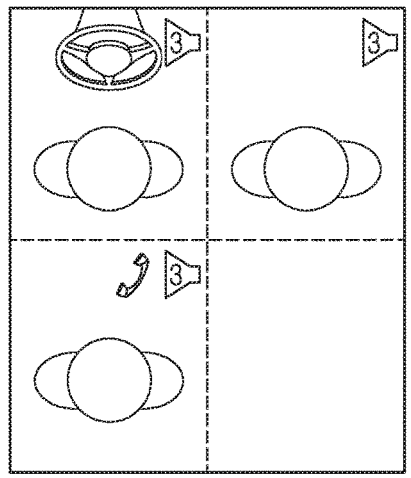 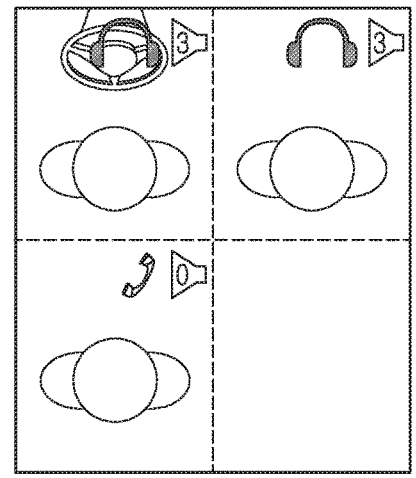

FIG. 17A(a)
| BOARDINGEVENT | |
|---|---|
| PASSENGERS | DAD, MOM |
| BOARDING TIME | 7:00 PM |
FIG. 17A(b)
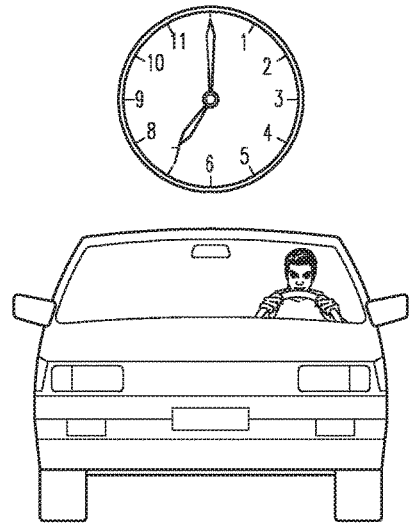
⇩ BOARDING EVENT CHANGE
FIG. 17A(c)
| BOARDINGEVENT | |
|---|---|
| PASSENGERS | DAD |
| BOARDING TIME | 7:00 PM |

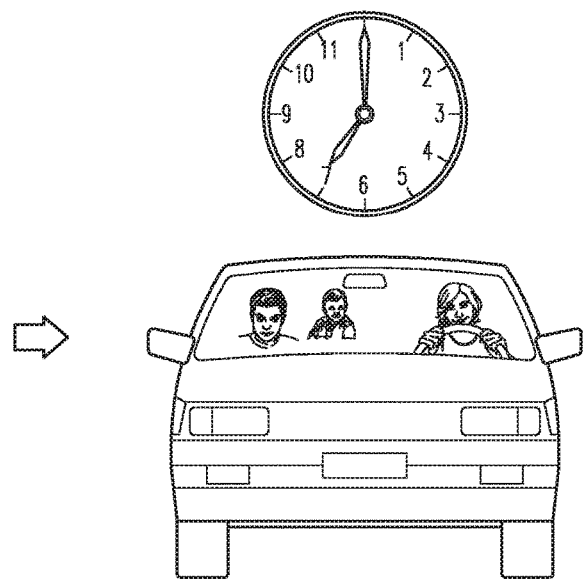

ELECTRONIC DEVICE AND METHOD USING MACHINE LEARNING FOR IDENTIFYING CHARACTERISTICS OF USERS LOCATED WITHIN A SPECIFIC SPACE

CROSS-REFERENCE TO RELATED APPLICATIONS

Pursuant to 35 U.S.C. § 119(a), this application claims the benefit of earlier filing date and right of priority to Korean Application No. 10-2017-0029576, filed on Mar. 8, 2017, the contents of which are incorporated by reference herein in its entirety.

BACKGROUND OF THE INVENTION

1. Field of the Invention

The present disclosure relates to smart device technology, and more particularly, to an electronic device using machine learning for identifying characteristics of users located within a specific space.

2. Background of the Invention

Advancements have been made in context awareness technology which includes devices able to recognize or predict a user's needs based on historical information, a user's environment, context of a present status of a user, or a user's particular schedule, and the like, using machine learning, data mining, pattern recognition, and other intelligent algorithms and technologies.

With the development of the foregoing context awareness technologies, there is an increasing demand for an improved terminal capable of accurately and effectively performing a function suitable for a user's current or upcoming environment or context.

Recently, with development of Internet of Things (IoT), technologies are being developed that provide environments optimized for users through communication links between objects (things). As a part of this technology development, the present disclosure proposes a method of providing an environment optimized for a user by performing a more organic control between objects in a manner of utilizing artificial intelligence and other techniques.

SUMMARY OF THE DISCLOSURE

Therefore, an aspect of the detailed description is to provide a space environment optimized for a user.

Another aspect of the detailed description is to provide an environment that meets a use purpose of a space (i.e., space use purpose) to a plurality of members using the space.

Disclosed here is an electronic device capable of controlling at least one device installed in a specific space, the electronic device including an learning data unit configured to recognize a user located within the specific space, and generate a control command for controlling an operation of the at least one device installed in the specific space, based on characteristic information related to the recognized user, and a controller configured to control the operation of the at least one device based on the control command generated in the artificial intelligence unit, wherein the learning data unit sets a driving condition of the at least one device by combining characteristic information related to each of a plurality of users when the plurality of user are located within the specific space.

In one embodiment disclosed herein, the learning data unit may predict a use purpose of the specific space based on the combination of the characteristic information related to each of the plurality of users located within the specific space, and set the driving condition of the at least one device to meet the predicted use purpose.

In one embodiment disclosed herein, a different driving command may be set for the at least one device according to a different use purpose of the specific space, and the learning data unit may set the driving condition of the at least one device using the driving command set according to the predicted use purpose.

In one embodiment disclosed herein, the learning data unit may extract common elements from the characteristic information regarding each of the plurality of users, and predict the use purpose of the specific space based on the extracted common elements.

In one embodiment disclosed herein, the learning data unit may learn the characteristic information regarding each of the plurality of users based on a machine learning technology.

In one embodiment disclosed herein, the characteristic information regarding the user may include at least one of biometric information, behavior information, log information related to the specific space, and companion information located together within the specific space.

In one embodiment disclosed herein, the electronic device may further include a communication unit configured to execute communication with an external device, and the learning data unit may predict a plurality of user to be located within the specific space on the basis of a message received from the external device through the communication unit.

In one embodiment disclosed herein, the learning data unit may receive a plurality of schedule information stored in a plurality of electronic devices through the communication unit, and the learning data unit may generate schedule information related to the specific space based on the received plurality of schedule information.

In one embodiment disclosed herein, the learning data unit may set the driving condition of the at least one device installed in the specific space, based on a combination of the characteristic information related to the plurality of users, so as to meet the schedule information related to the specific space, when the schedule information related to the specific space is generated.

In one embodiment disclosed herein, the electronic device may further include a camera configured to capture an image of the specific space, and the learning data unit may analyze the captured image of the specific space based on an image analysis algorithm, and detect a plurality of users located within the specific space using the analysis result.

An electronic device assisting driving of a vehicle according to another embodiment may include an learning data unit configured to learn boarding status information related to passengers seated in the vehicle, and a controller configured to control the vehicle based on the learned boarding status information, wherein the learning data unit monitors situation information related to the vehicle, and predicts a generation of a boarding event based on at least one of the learned boarding status information and the monitored situation information, and wherein the learning data unit extracts at least one control command to drive the vehicle from the learned boarding status information when the generation of the boarding event is predicted.

In one embodiment disclosed herein, the controller may control the vehicle based on the at least one control command extracted by the artificial intelligence unit.

In one embodiment disclosed herein, the boarding event may be an event that a passenger expected to be seated in the vehicle boards the vehicle at an expected boarding time.

In one embodiment disclosed herein, the learning data unit may set seat information to be seated by each of a plurality of passengers, based on the boarding status information related to each of the plurality of passengers, when a boarding event that the plurality of passengers board the vehicle is predicted.

In one embodiment disclosed herein, the controller may execute a seat posture control set for each of the plurality of passengers, based on the boarding status information related to each of the plurality of passengers.

In other embodiments, an electronic device includes a controller configured to: identify each of a plurality of users located within a specific space; and generate a control command for controlling operation of at least one device associated with the specific space based on characteristic information related to each of the identified plurality of users.

A further embodiment includes an electronic device for assisting in driving of a vehicle. The electronic device includes a memory and a controller configured to store, in the memory, boarding status information related to passengers; monitor situation information related to the vehicle; control the vehicle based on the learned boarding status information; predict a boarding event based on at least one of the boarding status information and the monitored situation information; and generating a control command for driving the vehicle based on the boarding status information and the predicting of the boarding event.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a flowchart illustrating a method of controlling a vehicle using an electronic device.

FIGS. 14A(a), 14A(b), 14A(c), 14B(a), 14B(b), 14B(c) illustrate methods of predicting passengers included in a boarding event.

FIGS. 16A(a), 16A(b), 16B(a), 16B(b) illustrate methods of controlling an environment of a vehicle during driving of the vehicle.

FIGS. 17A(a), 17A(b), 17A(c), 17B(a), 17B(b), 17B(c) illustrate embodiments of controlling a vehicle when an error occurs in prediction of a boarding event.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

Figure 1:
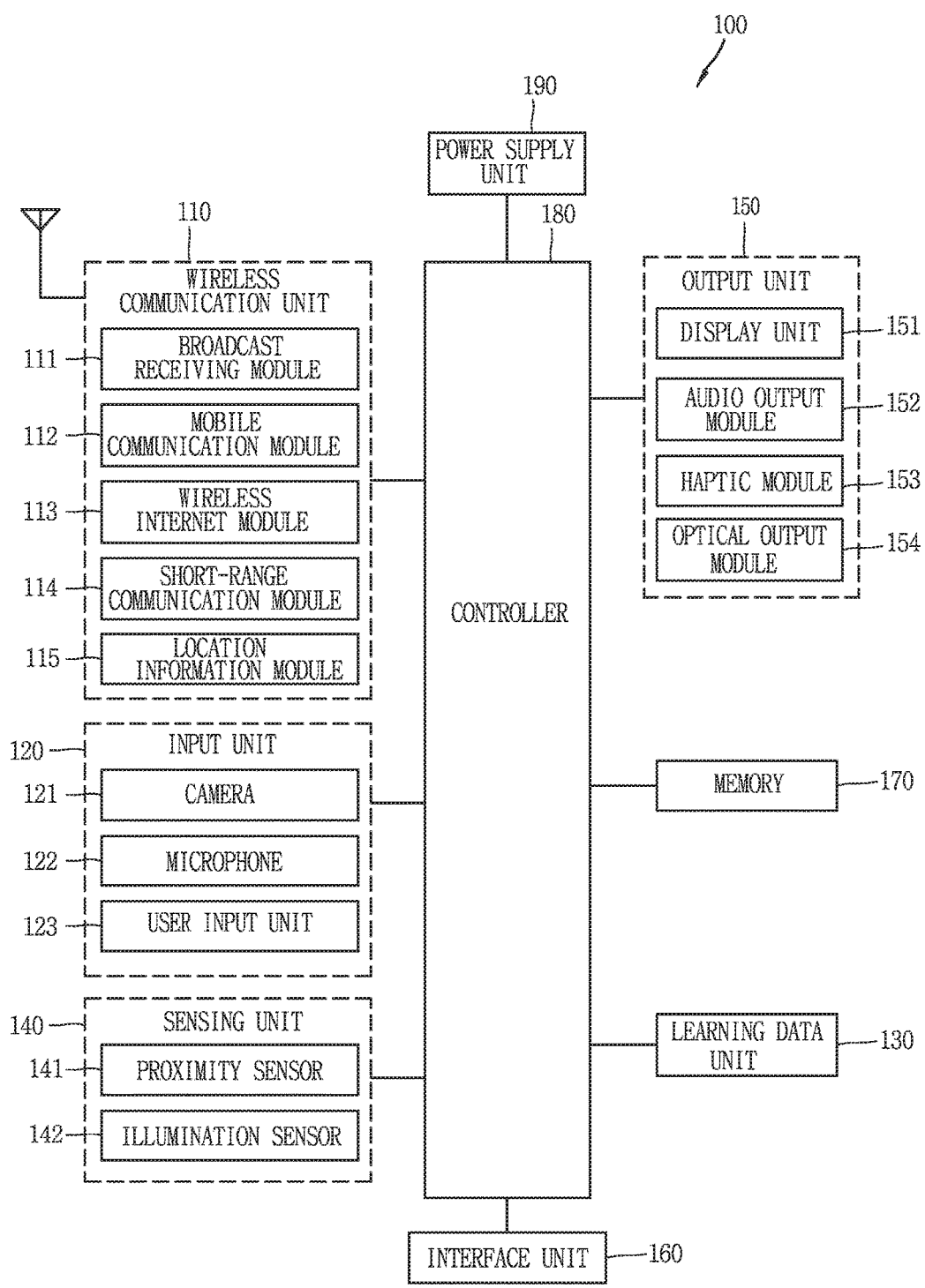
FIG. 1 is a block diagram of an electronic device in accordance with one exemplary embodiment of the present invention.

The terminal 100 may include components, such as a wireless communication unit 110, an input unit 120, learning data unit 130, a sensing unit 140, an output unit 150, an interface unit 160, a memory 170, a controller 180, a power supply unit 190 and the like. FIG. 1 illustrates the terminal having various components, but it is understood that implementing all of the illustrated components is not a requirement, and that greater or fewer components may alternatively be implemented.

In more detail, the wireless communication unit 110 of those components may typically include one or more modules which permit wireless communications between the terminal 100 and a wireless communication system, between the terminal 100 and another terminal 100, or between the terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The learning data unit 130 may be configured to receive, categorize, store, and output information to be utilized for data mining, data analysis, intelligent decision making, and machine learning algorithms and techniques. The learning data unit 130 may include one or more memory units configured to store data that is received, detected, sensed, generated, predefined, or otherwise output by the terminal, or received, detected, sensed, generated, predefined, or otherwise output by another component, device, terminal, or entity in communication with the terminal.

The learning data unit 130 may include memory incorporated or implemented at the terminal. In some embodiments, learning data unit 130 may be implemented using memory 170. Alternatively or additionally, the learning data unit 130 may be implemented using memory associated with the terminal, such as an external memory directly coupled to the terminal or memory maintained at a server in communication with the terminal. In other embodiments, the learning data unit 130 may be implemented using memory maintained in a cloud computing environment, or other remote memory location that is accessible by the terminal through a communication scheme, such as a network.

The learning data unit 130 is generally configured to store data in one or more databases to identify, index, categorize, manipulate, store, retrieve, and output the data for use in supervised or unsupervised learning, data mining, predictive analytics, or other machine learning techniques. The information stored at the learning data unit 130 may be utilized by the controller 180, or one or more other controllers of the terminal, using any of a variety of different types of data analysis and machine learning algorithms and techniques. Examples of such algorithms and techniques include k-Nearest neighbor systems, fuzzy logic (e.g., possibility theory), neural networks, boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may request, retrieve, receive, or otherwise utilize the data of the learning data unit 130 to determine or predict at least one executable operation of the terminal based on the information determined or generated using the data analysis and machine learning algorithms and techniques, and control the terminal to execute a predicted or desired operation among the at least one executable operation. The controller 180 may perform various functions implementing emulation of intelligence (i.e., knowledge based systems, reasoning systems, and knowledge acquisition systems); and including systems for reasoning with uncertainty (e.g., fuzzy logic systems), adaptive systems, machine learning systems, artificial neural networks, and the like.

The controller 180 may also include sub-modules to enable its performance and/or execution involving voice and natural speech language processing, such as an I/O processing module, environment condition module, a speech-to-text (STT) processing module, a natural language processing module, a task flow processing module, and a service processing module. Each of these sub-modules may also have access to one or more systems or data and models at the terminal, or a subset or superset thereof, including scheduling, vocabulary index, user data, task flow models, service models, and automatic speech recognition (ASR) systems. In other embodiments, the controller 180 or other aspects of the terminal may be implemented with said sub-modules, systems, or data and models.

In some examples, based on the data at the learning data unit 130, the controller 180 may be configured to perform detecting and sensing a need based on a contextual condition or a user's intent expressed in a user input or natural language input; actively eliciting and/or obtaining information needed to fully determine a need based on the contextual condition or a user's intent (e.g., by analyzing historical data including historical input and output, pattern matching, disambiguating words, input intentions, etc.); determining the task flow for executing a function in response to the need based on the contextual condition or user's intent; and executing the task flow to meet the need based on the contextual condition or user's intent.

In some embodiments, the controller 180 may implement specific hardware elements dedicated for learning data processes including memistors, memristors, transconductance amplifiers, pulsed neural circuits, artificially intelligent nanotechnology systems (e.g., autonomous nanomachines) or artificially intelligent quantum mechanical systems (e.g., quantum neural networks), and the like. In some embodiments, the controller 180 may include pattern recognition systems such as machine vision systems, acoustic recognition systems, handwriting recognition systems, data fusion systems, sensor fusion systems, and soft sensors. Machine vision systems can also include content based image retrieval, optical character recognition, augmented reality, egomotion, tracking or optical flow, and the like.

The controller 180 may be configured to collect, sense, monitor, extract, detect, and/or receive signals or data, via one or more sensing components at the terminal, in order to collect information for processing and storage at the learning data unit 130 and for use in data analysis and machine learning operations. Collection of information may include sensing information through a sensor, extracting information stored in the memory, such as memory 170, or receiving information from another terminal, entity, or an external storage through communication means. Thus in one example, the controller 180 may collect historical usage information at the terminal, store the historical usage information for use in data analytics, and at a future occurrence, determine a best match for executing a particular function using predictive modeling based on the stored historical usage information.

The controller 180 may also receive or sense information of the surrounding environment, or other information, through the sensing unit 140. In addition, the controller 180 may receive broadcast signals and/or broadcast-related information, wireless signals, wireless data, and the like through the wireless communication unit 110. The controller 180 may also receive image information (or a corresponding signal), audio information (or a corresponding signal), data, or user-input information from an input unit.

The controller 180 may collect information in real time, and process or categorize the information (for example, in a knowledge graph, command policy, personalization database, dialog engine, etc.), and store the processed information in the memory 170 or the learning data unit 130.

When the operation of the terminal is determined based on data analysis and machine learning algorithms and techniques, the controller 180 may control the components of the terminal to execute the determined operation. The controller 180 may then execute the determined operation by controlling the terminal based on the control command.

In some embodiments, when a specific operation is executed, the controller 180 may analyze history information indicating the execution of the specific operation through data analysis and machine learning algorithms and techniques and execute updating of previously-learned information based on the analyzed information. Accordingly, the controller 180, in combination with the learning data unit 130, can improve the accuracy of future performance of the data analysis and machine learning algorithms and techniques based on the updated information.

The sensing unit 140 may include at least one sensor which senses at least one of internal information of the terminal, a surrounding environment of the terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor so as to implement a touch screen. The touch screen may provide an output interface between the terminal 100 and a user, as well as functioning as the user input unit 123 which provides an input interface between the terminal 100 and the user.

The interface unit 160 may serve as an interface with various types of external devices connected with the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

The memory 170 may store a plurality of application programs (or applications) executed in the terminal 100, data for operations of the terminal 100, instruction words, and the like. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Terminal 100 is shown implemented with one controller 180 facilitating operation of all of the various units (e.g., wireless communication unit 110, input unit 120, learning data unit 130, sensing unit 140, output unit 150, interface unit 160, etc.) and submodules shown in the figure. However, one or more separate controllers 180 may alternatively be implemented for any or all of such units and submodules.

Furthermore, the controller 180 may control at least part of the components illustrated in FIG. 1, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180. The power supply unit 190 may include a battery, and the battery may be an embedded battery or a replaceable battery.

At least part of those elements and components may be combined to implement operation and control of the terminal or a control method of the terminal according to various exemplary embodiments described herein. Also, the operation and control or the control method of the terminal may be implemented in the terminal in such a manner of activating at least one application program stored in the memory 170.

Hereinafter, each aforementioned component will be described in more detail with reference to FIG. 1, prior to explaining various exemplary embodiments implemented by the terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like). The wireless signals may include audio call signal, video (telephony) call signal, or various formats of data according to transmission/reception of text/multimedia messages.

The wireless Internet module 113 denotes a module for wireless Internet access. This module may be internally or externally coupled to the terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the terminal 100 and a wireless communication system, between the terminal 100 and another terminal 100, or between the terminal and a network where another terminal 100 (or an external server) is located, via wireless personal area networks.

Here, the another terminal 100 may be a wearable device, for example, a smart watch, smart glasses or a head mounted display (HMD), which is able to exchange data with the terminal 100 (or to like data with the terminal 100). The short-range communication module 114 may sense (recognize) a wearable device, which is able to communicate with the terminal), near the terminal 100. In addition, when the sensed wearable device is a device which is authenticated to communicate with the terminal 100 according to the present disclosure, the controller 180 may transmit at least part of data processed in the terminal 100 to the wearable device via the short-range communication module 114. Hence, a user of the wearable device may use the data processed in the terminal 100 on the wearable device. For example, when a call is received in the terminal 100, the user may answer the call using the wearable device. Also, when a message is received in the terminal 100, the user may check the received message using the wearable device.

The location information module 115 denotes a module for detecting or calculating a position of the terminal. An example of the location information module 115 may include a Global Position System (GPS) module or a Wi-Fi module. For example, when the terminal uses the GPS module, a position of the terminal may be acquired using a signal sent from a GPS satellite. As another example, when the terminal uses the Wi-Fi module, a position of the terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the terminal. As a module used to acquire the location (or current location) of the terminal, the location information module 115 may not be necessarily limited to a module for directly calculating or acquiring the location of the terminal.

Next, the input unit 120 may be configured to provide an audio or video signal (or information) input to the terminal or information input by a user to the terminal. For the input of the audio information, the terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the terminal 100 may be arranged in a matrix configuration. By use of the cameras 121 having the matrix configuration, a plurality of image information having various angles or focal points may be input into the terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the terminal 100 to correspond to the input information. The user input unit 123 may include a mechanical input element (or a mechanical key, for example, a button located on a front/rear surface or a side surface of the terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the terminal, surrounding environment information of the terminal and user information, and generate a sensing signal corresponding to it. The controller 180 may control an operation of the terminal 100 or execute data processing, a function or an operation associated with an application program installed in the terminal based on the sensing signal. Hereinafter, description will be given in more detail of representative sensors of various sensors which may be included in the sensing unit 140.

First, a proximity sensor 141 refers to a sensor to sense presence or absence of an object approaching a surface to be sensed, or an object disposed near a surface to be sensed, by using an electromagnetic field or infrared rays without a mechanical contact. The proximity sensor 141 may be arranged at an inner region of the terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. In more detail, the position of the wave generation source may be calculated by using a time difference from the time that the ultrasonic wave reaches the sensor based on the light as a reference signal.

The camera 121 of the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the terminal 100. For example, the display unit 151 may display execution screen information of an application program driven in the terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 170 in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the terminal 100. The audio output unit 152 may include a receiver, a speaker, a buzzer or the like.

A haptic module 153 may generate various tactile effects that can be felt by a user. A representative example of tactile effect generated by the haptic module 153 may be vibration. The intensity, pattern and the like of vibration generated by the haptic module 153 may be controlled by a user's selection or the settings of the controller. For example, the haptic module 153 may output different vibrations in a combined manner or in a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the terminal 100.

An optical output unit 154 may output a signal for indicating an event generation using light of a light source. Examples of events generated in the terminal 100 may include a message reception, a call signal reception, a missed call, an alarm, a schedule notice, an email reception, an information reception through an application, and the like. A signal output by the optical output unit 154 may be implemented in such a manner that the terminal emits monochromatic light or light with a plurality of colors. The signal output may be terminated as the terminal senses a user's event checking.

The interface unit 160 may serve as an interface with every external device connected with the terminal 100. For example, the interface unit 160 may receive data transmitted from an external device, receive power to transfer to each element within the terminal 100, or transmit internal data of the terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the terminal 100 is connected with an external cradle, the interface unit 160 may serve as a passage to allow power from the cradle to be supplied to the terminal 100 therethrough or may serve as a passage to allow various command signals input by the user from the cradle to be transferred to the terminal therethrough. Various command signals or power input from the cradle may operate as signals for recognizing that the terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may be operated in relation to a web storage device that performs the storage function of the memory 170 over the Internet or other network.

As aforementioned, the controller 180 may typically control the general operations of the terminal 100. For example, the controller 180 may set or release a lock state for restricting a user from inputting a control command with respect to applications when a state of the terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may receive external power or internal power and supply appropriate power required for operating respective elements and components included in the terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, certain embodiments described herein may be implemented with separate software modules, such as procedures and functions, each of which perform one or more of the functions and operations described herein. The software codes can be implemented with a software application written in any suitable programming language and may be stored in memory (for example, memory 170), and executed by a controller or processor (for example, controller 180).

The display unit 151 may output information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two or more displays. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. Alternatively, the touch sensor may be integrally formed with the display. For example, the touch sensor may be disposed on a substrate of the display or within the display. The display unit 151 may form a touch screen together with the touch sensor. Here, the touch screen may serve as the user input unit 123.

The audio output module 152 may be implemented in the form of a receiver for transferring voice sounds to the user's ear or a loud speaker for outputting various alarm sounds or multimedia reproduction sounds.

The camera 121 may process video frames such as still or moving images obtained by the image sensor in a video call mode or a capture mode. The processed video frames may be displayed on the display unit 151 or stored in the memory 170.

The user input unit 123 may be manipulated by a user to input a command for controlling the operation of the terminal 100.

The terminal 100 may also include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

At least one antenna for wireless communication may be disposed on the terminal body. A power supply unit 190 for supplying power to the terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Figure 2:
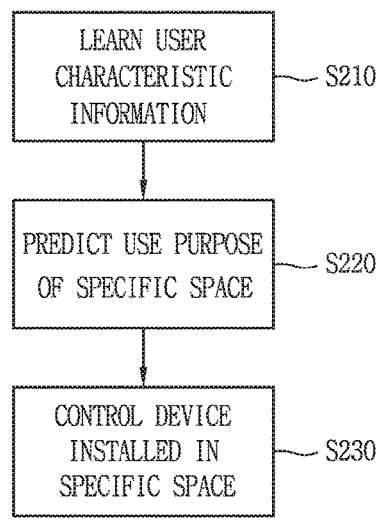
FIG. 2 is a flowchart illustrating a method of controlling a specific space for providing an environment optimized for a user.
Figure 3:
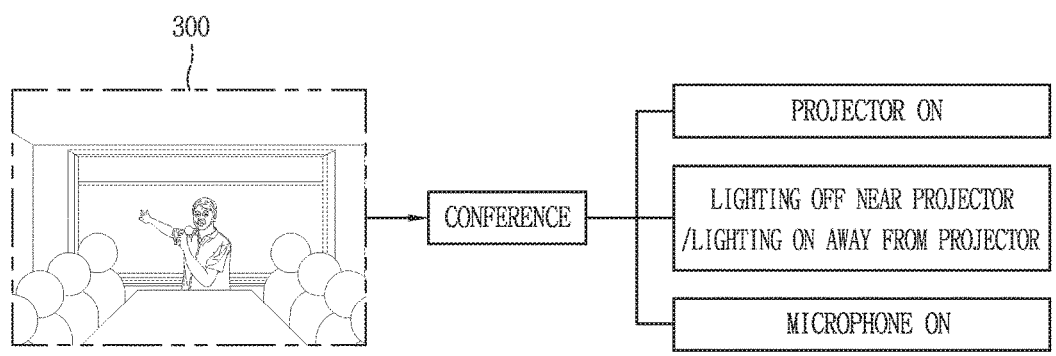
FIG. 3 illustrates the control method of FIG. 2.

FIG. 2 is a flowchart illustrating a method of controlling a specific space for providing an environment optimized for a user. FIG. 3 illustrates the control method of FIG. 2.

First, referring to FIG. 2, an electronic device according to an embodiment may learn specific information related to a user located in a specific space through the learning data unit 130 (S210). Again, reference to learning data unit 130 is an example, and such teachings apply as well to functions and the like performed by controller 180.

The specific space may be a three-dimensional space in which a person or object can be located (or otherwise exist). For example, the specific space may be an inner space of a vehicle, an inner space of a house, an office in a building, a conference room, and the like.

The learning data unit 130 may recognize (or sense) the user located within the specific space. Here, the operation of recognizing the user includes an operation of sensing the user located within the specific space, and an operation of inferring, guessing or predicting presence or identity of a user who is expected to be located within the specific space.

The learning data unit 130 may recognize the user located within the specific space on the basis of at least one of information received from an external device, and sensing information sensed (detected) by the sensing unit 140 provided in the electronic device 100.

For example, the learning data unit 130 may recognize that the user is located within the specific space based on an input signal received from a smart phone belonging to the user. As another example, the learning data unit 130 may recognize the user located within the specific space based on an image captured by the camera 121 which is set to capture object present within the specific space. As another example, the learning data unit 130 may infer that a specific person will be located within the specific space based on analysis information obtained by analyzing message contents exchanged with the specific person.

The learning data unit 130 may learn characteristic information related to the user located in the specific space. The characteristic information related to the user may include at least one of user-related biometric information, user behavior information, log information indicating a usage history of the space, and companion information using the space together.

In detail, the user's biometric information may include information related to the user's body, such as heart rate information, blood flow information, height, body type, gender, and age. The user's behavior information may include motion information of the user within the space, such as the user's clothing, voice information uttered by the user, the user's moving line, and the user's movement. The log information may include driving (or operation) information related to at least one device installed (or located) in the space, time information related to the space being used by the user, weather information at the time when the user uses the space, and the like. The companion information may be information of a person located in the specific space at the same time as the user.

The user characteristic information may be sensed through the sensing unit 140 provided in the electronic device, or may be collected from data input or output by the user to or from the electronic device. For example, the learning data unit 130 may sense biometric information such as height and weight of the user located in the space and behavior information regarding the user in the space, on the basis of image information captured by the camera 121. As another example, the learning data unit 130 may collect the log information related to the space indicating the usage history of the space, based on data that the user inputs or outputs to or from the electronic device.

In addition, the user characteristic information may be received from an external device capable of performing communication with the electronic device. External devices that may be implemented include devices capable of performing communication with electronic devices, and examples of the external devices may include a smart phone, a wearable device (e.g., a smart watch), a cloud server, and the like. For example, the learning data unit 130 may perform communication with a smart watch worn by the user to receive user-related heart rate information, user-related blood flow rate information, and the like which is sensed by the smart watch.

The learning data unit 130 may learn the user characteristic information based on the machine learning technique. Specifically, the learning data unit 130 may extract common elements from the user characteristic information, assign different weights to the common elements which are common to each of pieces of information, and learn the user characteristic information in a form of an artificial neural network. Here, the common element may be generated by learning information stored in the electronic device and information stored in the communication-available cloud server.

For example, as illustrated in FIG. 3, when a user located in a specific space 300 drives a projector and a microphone together, the learning data unit 130 may extract a common element that the projector and the microphone are devices used for a conference, and assign a weight to an element indicating a conference every time when the projector and the microphone are driven.

As another example, when the user located in the specific space controls lighting at intermediate brightness and reproduces a sound source of a calm genre, the learning data unit 130 may extract a common element that the control of the lighting at the intermediate brightness and the reproduction of the sound source of the calm genre are used to relieve stress, and assign a weight to an element indicating a relaxation (rest) even time when the lighting control and the sound source reproduction are executed.

Also, the learning data unit 130 may extract difference elements of the plurality of characteristic information in the same manner. In addition, the learning data unit 130 may learn the user characteristic information based on various statistical algorithms. Such learning methods are already known and thus will not be described in detail herein.

The learning data unit 130 may learn the user characteristic information and predict a use purpose of the space (i.e., space use purpose) on the basis of the characteristic information (S220).

The user located in the specific space may have the space use purpose for using the specific space. The space use purpose refers to the purpose that the user uses the specific space. For example, the user may have a conference as the space use purpose for a conference room. Also, the user may have relaxation as the space use purpose for a resting room.

The space use purpose may be different for each user. For example, for the same space, a user A may use the space for the purpose of relaxation, and a user B may use the space for the purpose of a conference.

When the user is recognized in the specific space, the learning data unit 130 may predict (or decide) the space use purpose based on the characteristic information regarding the user located in the specific space.

Specifically, the learning data unit 130 may decide the use purpose having the highest probability among a plurality of use purposes that the user can use the space, based on the user characteristic information. This probability may be calculated using the learned user characteristic information based on the machine learning technique described in step S210.

For example, as illustrated in FIG. 3, when a person A is located in the specific space, the learning data unit 130 may predict a conference having the highest probability among a plurality of space use purposes as the space use purpose of the person A, on the basis of the learned user characteristic information. As another example, when a person B is located in the specific space, the learning data unit 130 may predict relaxation having the highest probability among a plurality of space use purposes as the space use purpose of the person B, on the basis of the learned user characteristic information.

Therefore, even if the user does not make a separate action within the specific space or does not input a control command for controlling the space, the learning data unit 130 may predict the space use purpose for which the user is expected to use the space, on the basis of the user characteristic information learned through the machine learning technology.

Also, the space use purpose may be decided by the user recognized within the space and a time at which the user is located within the space. For example, when a person A is located in the specific space at 1:00 pm, the learning data unit 130 may predict a conference as the space use purpose. On the other hand, when the person A is located in the specific space at 6:00 pm, the learning data unit 130 may predict dinner as the space use purpose.

Meanwhile, at least one device may be installed in the specific space according to a space use purpose. For example, a projector, a microphone, a speaker, a lighting, a chair, a desk, and the like may be provided in a conference room. As another example, a sofa, a TV, a speaker, a lighting, an air conditioner, a clock, and the like may be provided in a living room. In addition, various electronic devices may be installed in the specific space.

The learning data unit 130 may set a driving condition of at least one device installed in the specific space to meet a predicted use purpose when a user located in the specific space is sensed. That is, the learning data unit 130 may set a driving condition for driving at least one device installed in the space by a driving method according to the space use purpose, in order to allow the user located in the space to use the space more conveniently according to the predicted use purpose.

For example, as illustrated in FIG. 3, when a user located in the specific space 300 is detected, the learning data unit 130 may predict the user's space use purpose as 'conference'. The learning data unit 130 may set driving conditions associated with a projector, a lighting, and a microphone to meet the 'conference' as the space use purpose. For example, the learning data unit 130 may set driving conditions such as 'Projector ON', 'Lighting OFF near the projector//Lighting ON away from the projector, and 'Microphone ON'.

The space use purpose may include a preset driving condition for at least one device. The driving condition for the at least one device may be extracted from the user characteristic information.

For example, the learning data unit 130 may extract operation information related to power-on of the project, power-on of the microphone, and the lighting control from log information related to the space used for the purpose of a conference. The learning data unit 130 may set a driving condition based on operation information related to at least one device extracted from the log information and store the set driving condition in the memory 170.

In this instance, the learning data unit 130 may set the driving condition of the at least one device by considering not only the log information regarding the space used by the user located in the specific space but also log information regarding the space used by other users for the same space use purpose as the user. Here, the log information regarding the space used by the other users may be stored in a communication-available external server, or may be stored in the memory of the electronic device.

That is, one embodiment can provide a space environment according to a method that the user located within the specific space uses the specific space, and also create an environment of the specific space to be optimized for a specific use purpose by considering even driving methods of other users who have used the specific space for the same space use purpose. This may result in improving user convenience in using the specific space.

In addition, the learning data unit 130 may set a driving condition of at least one device in consideration of the space use purpose and biometric information related to the user located in the specific space. For example, when the space use purpose is a conference, the learning data unit 130 may arrange a seat or chair closest to the projector in consideration of information related to the user's height or eyesight at the time of arranging the user's seat in a conference room. As another example, when the space use purpose is the conference, the learning data unit 130 may arrange the user's seat at the farthest position from an air conditioner in consideration of the user's body temperature at the time of arranging the user's seat in the conference room.

The learning data unit 130 may transfer a driving command according to the driving condition of the at least one device to the controller 180 so that the at least one device can be driven according to the use purpose. The controller 180 may drive the at least one device based on the transferred driving command. For example, the controller 180 may control a lighting installed in the specific space to be turned on.

As such, the foregoing description presents a method of predicting the use purpose of the specific space based on the characteristic information regarding the user located in the specific space and controlling the specific space to meet the predicted use purpose. This may result in improving the user convenience in using the specific space.

Figure 4:
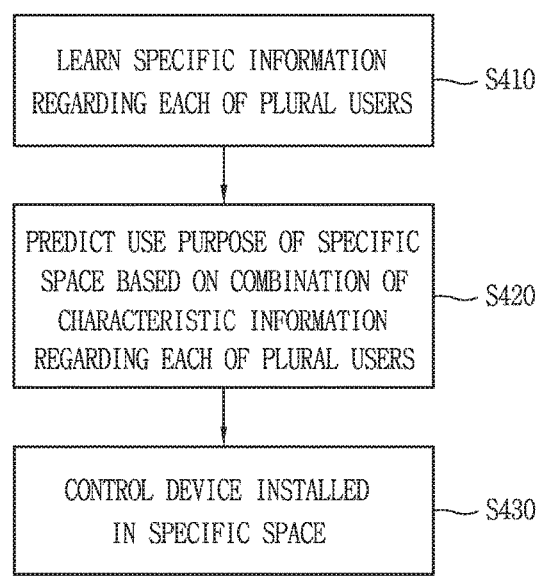
FIG. 4 is a flowchart illustrating a method of controlling a specific space when a plurality of users are located in the specific space.
Figure 5A:
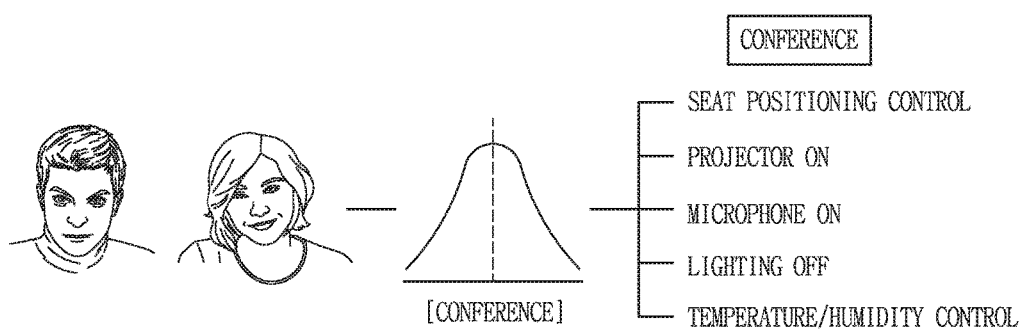
FIGS. 5A and 5B illustrate the control method of FIG. 4.
Figure 5B:
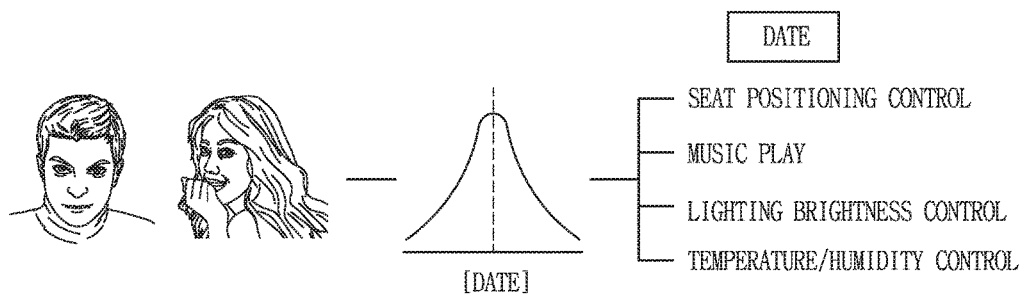

FIG. 4 is a flowchart illustrating a method of controlling a specific space when a plurality of users are located in the specific space. FIGS. 5A and 5B illustrate the control method of FIG. 4.

The electronic device according to an embodiment may control an operation of at least one device located in a specific space according to a user located in the specific space. The specific space may be used by plural users. In this scenario, a use purpose for the specific space may differ according to what kind of users are using the specific space. Therefore, discussion will now include a method of creating an environment of a space when a plurality of users are using the space.

Referring to FIG. 4, the learning data unit 130 of the electronic device 100 may learn characteristic information related to each of the plurality of users located within the specific space (S410).

First, the learning data unit 130 may recognize (or detect) the plurality of users located within the specific space. In detail, the learning data unit 130 may detect the plurality of users located within the specific space through the sensing unit which is capable of detecting an object located within the specific space. For example, the learning data unit 130 may detect the plurality of users through a camera positioned within the specific space. In this embodiment, the learning data unit 130 may analyze image information in which the plurality of user are captured, and identify the plurality of users based on the analysis result.

The learning data unit 130 may learn characteristic information related to each of the plurality of users when the plurality of users are identified. This learned information may be generated as a personalized database corresponding to each of the plurality of users. Description related to the learning of the learning data unit is similar to that of block S210 of FIG. 2, and is not repeated here.

The learning data unit 130 may predict a use purpose of the specific space based on a combination of the characteristic information related to the plurality of users (S420).

The learning data unit 130 may combine the characteristic information related to each of the plurality of users when the plurality of users located within the specific space are detected. In detail, the learning data unit 130 may extract a common element from the characteristic information related to the plurality of users. For example, when an operation 'Projector ON' is commonly included in characteristic information related to a person A and characteristic information related to a person B, the learning data unit 130 may extract the operation 'Projector ON' as the common element. As another example, when an operation 'Music reproduction' is commonly included in the characteristic information related to person A and the characteristic information related to person B, the learning data unit 130 may extract the operation 'Music reproduction' as the common element.

Also, the learning data unit 130 may extract as the common element information generated among the plurality of users, such as conversations among the plurality of users, behavior information regarding the plurality of users, and the like, from each characteristic information. For example, the learning data unit 130 may extract a conversation between the persons A and B as the common element.

The learning data unit 130 may predict (or decide) a use purpose that the plurality of users use the specific space, on the basis of the extracted common element. For example, as illustrated in FIG. 5A, the learning data unit 130 may predict 'conference' as the use purpose, based on the operation 'Projector ON' and a conversation between the persons A and B of, for example, "The conference will begin". As another example, the learning data unit 130 may predict 'date' as the use purpose, based on the operation 'Music reproduction' and a conversation between persons A and C of, for example, 'Go out with me'.

That is, this feature may recognize the change of the purpose for using the specific space according to a group (or combination) of the users located within the specific space.

For ease of discussion, the above description is based on the common element of the plurality of characteristic information, but a difference element of the plurality of characteristic information may also be extracted in a similar manner. That is, the learning data unit 130 may extract the common element and the difference element of the plurality of characteristic information, and predict the use purpose by combining information related to the common element and the difference element.

Referring back to FIG. 4, the controller 180 of the electronic device 100 according to the present invention may control at least one device located in the specific space (S430). The learning data unit 130 may set a driving condition of the at least one device in the specific space based on the predicted use purpose. For example, the learning data unit 130 may set the driving condition of the at least one device to 'conference' when 'conference' is predicted as the use purpose. The method of setting the driving condition of the at least one device has been described in relation to block S230, so further discussion is omitted.

The learning data unit 130 may then transfer the driving condition of the at least one device to the controller 180 such that the at least one device can be driven according to the set driving condition. The controller 180 may thus control the at least one device based on the transferred driving condition of the at least one device.

For example, referring to FIG. 5A, when 'conference' is the use purpose, the controller 180 may execute a seat positioning control that the seats are into postures to be appropriate for the users to be seated, projector ON, microphone ON, lighting OFF, and an air-conditioning system control for a temperature/humidity control.

As another example, as illustrated in FIG. 5B, when 'date' is the use purpose, the controller 180 may execute a seat positioning control that the seats are into postures to be appropriate for the users to be seated, speaker ON for a music reproduction, a lighting brightness control and an air-conditioning system control for a temperature/humidity control.

Description has been provide of methods of providing the specific space according to an environment appropriate for the plurality of users when the plurality of users located within the specific space are detected. Accordingly, such features provide the most appropriate or desirable environment to the users located within the specific space.

Figure 6A:
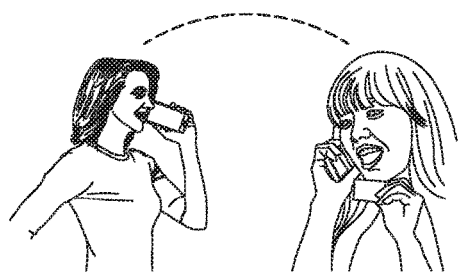
FIGS. 6A(a), 6A(b), 6A(c), 6A(d), 6B(a), 6B(b), 6C illustrate a method of recognizing a plurality of users who use a specific space.
Figure 6A:
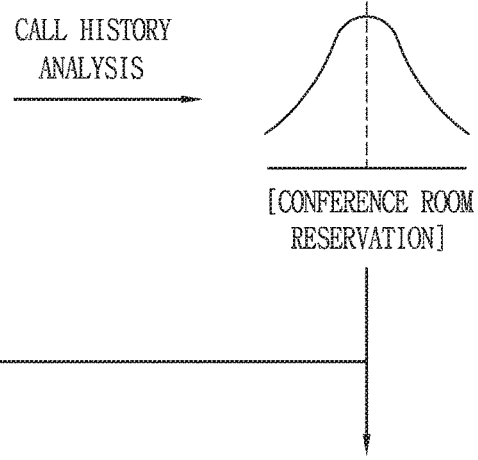
Figure 6A:
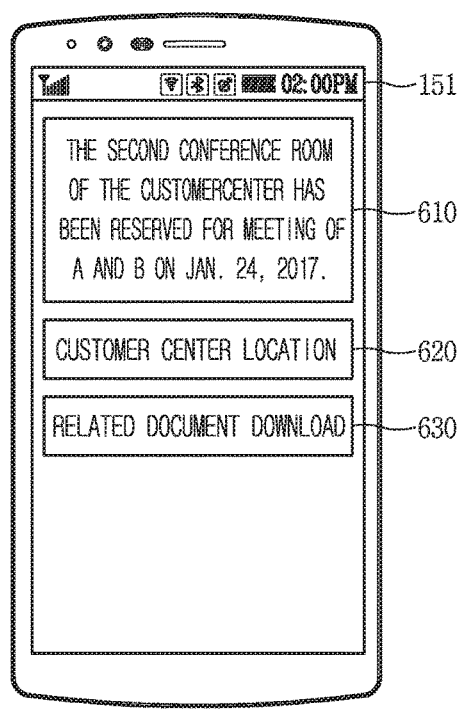
Figure 6A:
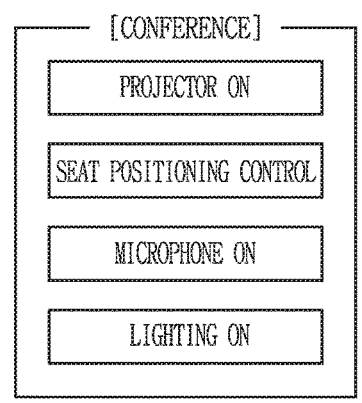

Reference is now made to FIGS. 6A(a), 6A(b), 6A(c), 6A(d), 6B(a), 6B(b), 6C that illustrate a method of recognizing a plurality of users who use a specific space.

The learning data unit 130 of the electronic device 100 may detect a plurality of users currently located within a specific space, or predict a plurality of users expected to be located within the specific space in future. In this example, learning data unit 130 may receive information related to each of the plurality of users from an external device, or receive image information in which the plurality of users are captured through the camera provided in the electronic device 100. The information related to each of the plurality of users may include information related to conversations associated with the specific space among the plurality of users, conversation information, information related to a post uploaded on an SNS server and the like.

For example, as illustrated in FIG. 6A(a), the learning data unit 130 may analyze conversations between persons A and B. The conversations between the persons A and B may be received from an external device (mobile terminals belonging to A and B), or extracted from a call signal event generated in the electronic device 100.

The learning data unit 130 may analyze the conversation based on a preset algorithm (e.g., a conversation analysis algorithm). The learning data unit 130 may extract information indicating that persons A and B are to be located in the specific space at a specific time, based on the analyzed result. That is, the learning data unit 130 may predict that the persons A and B will be located in the specific space at the specific time. An algorithm well known in the related art may be used as the conversation analysis algorithm, so description thereof will be omitted.

In this instance, the learning data unit 130 may predict (or decide) a use purpose of the persons A and B for the specific space by combining characteristic information related to each of the persons A and B and the conversation. For example, as illustrated in FIG. 6A(b), the learning data unit 130 may predict 'conference' as the use purpose.

As illustrated in FIG. 6A(d), the learning data unit 130 may transfer the driving condition for controlling the device installed in the specific space to the controller 180, in order to control the specific space. The controller 180 may control the device based on the driving condition transferred from the learning data unit 130. Therefore, the user can be provided with an appropriate environment according to the space use purpose.

Additionally, the learning data unit 130 may transfer notification information related to the specific space to each of the plurality of users to guide the predicted plural users to use the specific space. For example, as illustrated in FIG. 6A(c), the learning data unit 130 may transmit notification information including schedule information 610, a location 620 of the specific space and a document 630 associated with the use purpose, to contact information (phone number) corresponding to each of the persons A and B. Accordingly, the plurality of users may conveniently check various information related to the specific space. The notification information may be output in at least one of visible, audible and tactile manners.

Also, the controller 180 may decide an output time point of the notification information according to the schedule information related to the specific space. For example, the controller 180 may output the notification information 1 hour before a specific time which is included the schedule information related to the specific space. Therefore, the users can check the notification information at appropriate time points.

Alternatively, the learning data unit 130 may transmit the notification information at different time zones, considering a location of each of the plurality of users and the location information related to the specific space. For example, if a user is located one hour away from the specific space, the notification information may be transmitted one hour before, and if the user is located five minutes away from the specific space, the notification information may be transmitted five minutes before. In other words, the learning data unit 130 may provide appropriate information for each user by transmitting the notification information at an appropriate time point in consideration of the current location of each user.

Also, as illustrated in FIG. 6B(a), the learning data unit 130 may recognize (or detect) a plurality of users located in a specific space through a camera that is installed in the specific space to capture the inside and outside of the specific space. In this instance, the learning data unit 130 may recognize the users located in the specific space through an image analysis algorithm, combine characteristic information related to the recognized users, and predict a space use purpose (e.g., a conference such as that shown in FIG. 6B(b)).

In addition, the learning data unit 130 may sense that a use purpose for a specific space has changed. More specifically, the learning data unit 130 may detect that an additional user is located in a specific space or a user located in the specific space has left. For example, as illustrated in FIG. 6C, the learning data unit 130 may further detect a user C in a state where users A and B are already located in the specific space.

In this instance, the learning data unit 130 may predict the space use purpose again, based on a combination of characteristic information related to the additional user and characteristic information related to existing users. If the space use purpose has not changed, the learning data unit 130 may not generate a separate control command. On the other hand, if the space use purpose is changed, the learning data unit 130 may set a driving condition of at least one device to meet the changed use purpose. For example, as illustrated in FIG. 6C, the learning data unit 130 may change the space use purpose from 'conference' to 'relaxation'. In this instance, the learning data unit 130 may perform 'Lighting ON', 'Projector OFF', and 'Seat posture control' to meet the new relaxation purpose.

Alternatively, the learning data unit 130 may predict that time information scheduled for a plurality of users to be located in the specific space is changed. In this instance, the learning data unit 130 may transmit notification information so that the users recognize the changed time information. Therefore, the users can recognize the changed use time.

Alternatively, when only a portion of the users is located in the specific space, the learning data unit 130 may transmit notification information to the remaining users. Also, current location information related to the remaining users may be transmitted to those several users located in the specific space. That is, when a plurality of users to be located in the specific space are recognized, the learning data unit 130 may provide each user with notification information related to the specific space, to faithfully play the role of an individual secretary of each user.

Figures 7A, 7B:
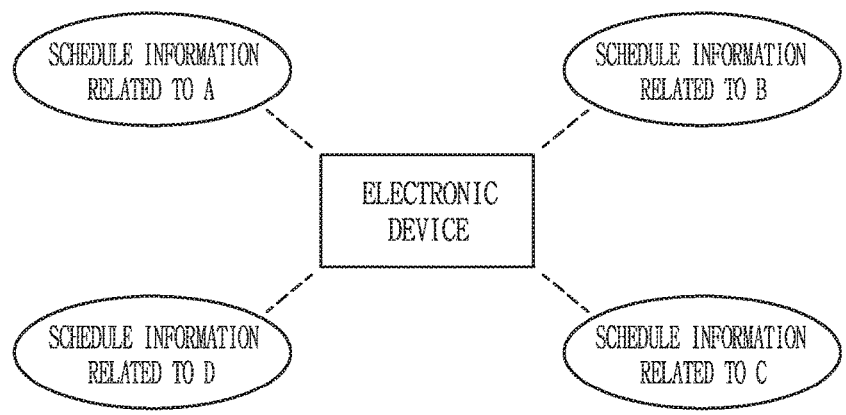
FIGS. 7A, 7B illustrate a method of generating schedule information related to a specific space by combining schedule information regarding a plurality of users.

The foregoing description is an example of a method of recognizing users located in the specific space. Description will be provided of a method of generating schedule information related to a specific space by a combination of schedule information related to each of a plurality of users. FIGS. 7A, 7B illustrate a method of generating schedule information related to a specific space by combining schedule information regarding a plurality of users.

Referring first to FIG. 7A, the learning data unit 130 may receive schedule information related to each of a plurality of users A, B, C and D through communication with a plurality of external devices. For example, the learning data unit 130 may receive schedule information stored in each of the plurality of external devices through Bluetooth communication. The schedule information may be information including place information, time information and date information.

The learning data unit 130 may learn the schedule information related to each of the plurality of users based on machine learning technology. In detail, the learning data unit 130 may extract a common element and a difference element of each of those pieces of schedule information, and generate schedule information related to the specific space based on the extracted common element and difference element.

For example, as illustrated in FIG. 7B, the learning data unit 130 may generate schedule information indicating that the users A, B, C and D are to use a second conference room at 7:00 pm on Mar. 1, 2017. That is, the learning data unit 130 may also predict a user to use the specific space, a time to use the specific space, and a date to use the specific space.

In this instance, the learning data unit 130 may control at least one device located at the specific space according to the generated schedule information related to the specific space. As such, the learning data unit 130 may set a driving condition of the device based on the schedule information and characteristic information related to each of the users using the specific space. These feature provides, among other things, an optimized environment of the specific space according to the schedules of the users.

When the schedule information related to the specific space is generated, the learning data unit 130 may transmit notification information notifying the schedule information related to the specific space to an external device corresponding to at least one user included in the schedule information related to the specific space. For example, when the users A, B, C and D are included in the schedule information related to the specific space, the controller 180 may transmit notification information notifying the schedule information related to the specific space to smart phones belonging to the users A, B, C and D. The notification information may include place information, a moving path, and the like.

Meanwhile, although not illustrated, the learning data unit 130 may decide a location of a specific space in which a plurality of users are to gather, on the basis of schedule information related to the users. In detail, the learning data unit 130 may decide information related to one space to be set as the specific space among at least one place that the users usually frequently visit. That is, a space to be used as the specific space can be decided. In this example, the learning data unit 130 may provide an optimal environment by controlling at least one device located at the decided specific space through communication.

The foregoing description is an example of a method of generating the schedule information related to the specific space using the schedule information. Accordingly, optimal meeting place and meeting time may be identified by considering schedules of all of users through artificial intelligence. The system may set a driving condition of at least one device located at a specific space based on characteristic information related to users located within the specific space, and control the at least one device to be driven according to the set driving condition. Therefore, an optimized space environment may be realized according to space use characteristics of the users.

A further feature is that at least one device installed in a specific space can be driven to meet a space use purpose of a user located in the specific space, thereby improving the user convenience in using the space.

Next described is a method in which an electronic device executes a vehicle control according to an embodiment of the present invention. In particular, FIG. 8 is a flowchart illustrating a method of controlling a vehicle using an electronic device and FIGS. 9 to 12 illustrate a control method of FIG. 8.

The electronic device may execute communication with a vehicle in a wired or wireless manner, and control the vehicle through the communication with the vehicle. The communication may be short-range communication, Vehicle-to-everything (V2X) communication, optical communication, and the like, applied in the vehicle. Other communication methods to be employed in the vehicle may also be used. When the electronic device is used for the vehicle control, it may also be referred to as a driving assistant device, a vehicle control device, a vehicle driving device and the like. A method of controlling a vehicle using an electronic device will now be described in more detail.

Referring to FIG. 8, the learning data unit 130 of the electronic device may learn boarding status information (S810).

Figure 9:
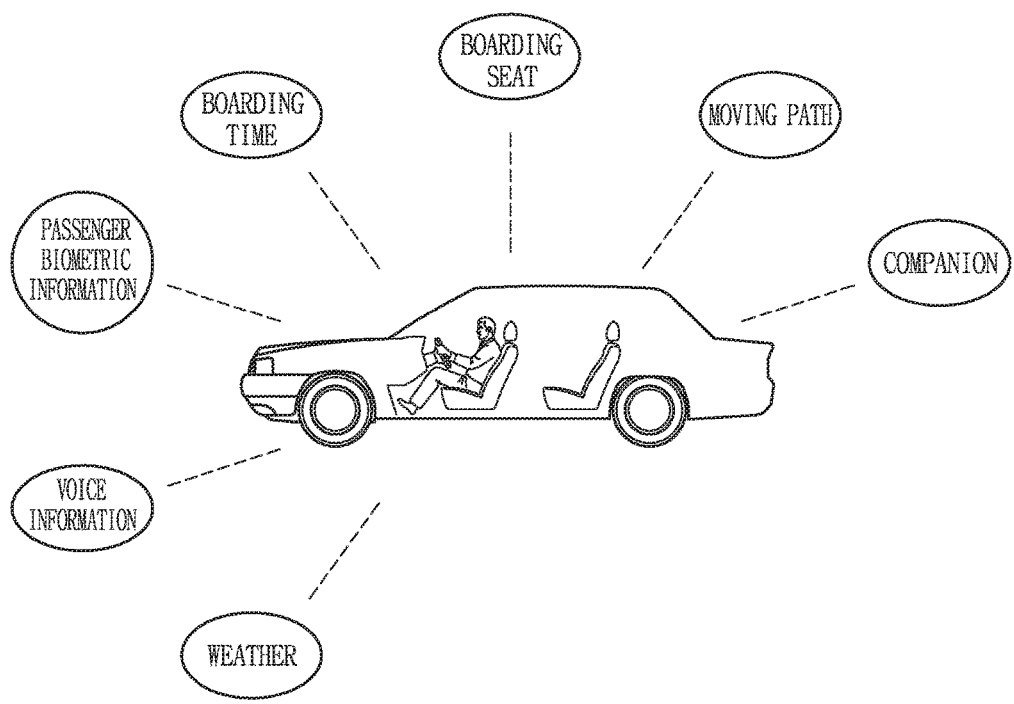
FIGS. 9 to 11 and 12A, 12B and 12C illustrate the control method of FIG. 8.

Referring to FIG. 9, the boarding status information may include one or more of biometric information related to a passenger seated in a vehicle, information related to a surrounding environment of the passenger at the time of boarding the vehicle, or information related to a vehicle control at the time when the passenger boards the vehicle. The biometric information related to the passenger may include one or more of heart rate information, body temperature information and the like. The information related to the surrounding environment may include boarding time information, passenger voice information, boarding seat information, weather information at the time of boarding, information related to an air conditioning system such as temperature information and humidity information around the passenger, speaker volume information, display ON/OFF information, seat arrangement information, companion information, and the like. The information related to the vehicle control may include destination information related to the passenger, route (moving path) information related to the vehicle, average speed information related to the vehicle, driving style information, and the like.

The learning data unit 130 may learn the boarding status information based on the machine learning technique. Specifically, the learning data unit 130 may analyze the learned boarding status information based on a plurality of elements. Here, the plurality of elements may be common elements and difference elements extracted from a plurality of boarding status information.

Figure 10:
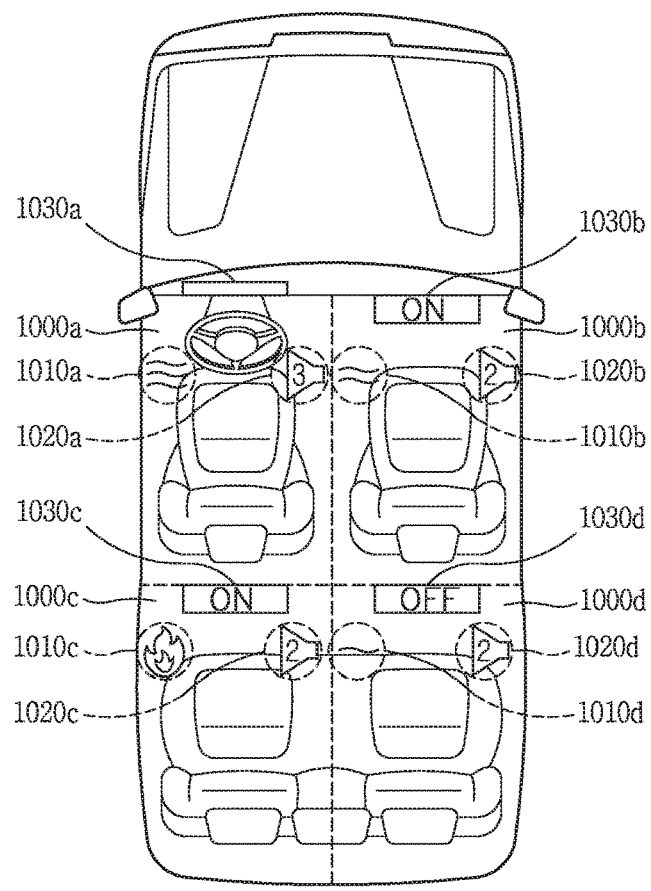

Referring now to FIG. 10, the vehicle may include air conditioning systems 1010a, 1010b, 1010c and 1010d, speakers 1020a, 1020b, 1020c and 1020d, and display units 1030a, 1030b, 1030c, 1030d for seats 1000a, 1000b, 1000c and 1000d, respectively, disposed in the vehicle. The air conditioning system, the speaker, and the display unit provided for each seat of the vehicle may be independently controlled. Therefore, the passenger seated in each seat can be provided with an optimized environment according to the tendency or desire of the passenger.

The learning data unit 130 may learn boarding status information for each seat occupied by the passenger. For example, when a plurality of passengers board the vehicle, the learning data unit 130 may learn boarding status information for each seat occupied by the passengers. Therefore, the learning data unit 130 may learn locations of boarding seats according to the combination of the plurality of passengers and information related to a surrounding environment of each passenger seated in the seat.

The learning data unit 130 may predict a boarding event based on the learned information (FIG. 8, S820). The boarding event may be an event that a passenger gets in the vehicle at a specific time.

The learning data unit 130 may predict a boarding event that a specific person is to board the vehicle at a specific time when it is detected that the specific person boards the vehicle at a specific time for a preset number of times or more. For example, the boarding event may be an event where Mom boards the vehicle at 7:00 pm.

The learning data unit 130 may predict a boarding purpose of the boarding event based on a machine learning technique. The boarding purpose is a purpose that a passenger wants to use the vehicle, for example, a purpose of going to work, a purpose of travel, or a purpose of shopping. In addition, there may be various purposes that the passengers want to do after boarding the vehicle.

A method of predicting the boarding purpose will now be described in more detail. The learning data unit 130 may classify boarding status information related to passengers stored in an external server and boarding status information related to the passengers boarded in the vehicle into preset reference elements, on the basis of a machine learning technique. The preset reference elements may be common elements and difference elements included in those pieces of the boarding status information.

The learning data unit 130 may set a weight for each of the reference elements, and predict a specific boarding purpose according to passenger information and boarding time information included in the boarding event. For example, if it is predicted through the boarding event that the passenger information is 'Mom' and the boarding time is '7:00 pm', the learning data unit 130 may predict the boarding purpose as 'Home from work' based on the boarding status information related to the Mom as the passenger. As another example, if it is predicted through the boarding event that the passenger information is 'Mom' and the boarding time is '10:00 am', the learning data unit 130 may predict the boarding purpose as 'shopping' based on the passenger status information related to the Mom as the passenger. That is, the learning data unit 130 may predict the most proper boarding purpose by considering all of the passenger information, the boarding time information, and the boarding status information related to the passenger.

On the other hand, the learning data unit 130 may predict a boarding event including a plurality of passengers. In this instance, the learning data unit 130 may predict a boarding purpose based on a combination of boarding status information of each of the plurality of passengers. In this regards, reference is made to FIG. 12A, which depicts various boarded passenger configurations in a vehicle, FIG. 12B, which is a table of boarding events data for each of the configurations of FIG. 12A, and FIG. 12C, which is a table of vehicle control data for each of the configurations of FIG. 12A.

In these figures, when 'Dad', 'Mom', and 'Kid' board the vehicle together, the learning data unit 130 may predict the boarding purpose as a travel, on the basis of a combination of boarding status information related to each of those passengers. As another example, when 'Mom' and 'Kid' board the vehicle, the learning data unit 130 may predict the boarding purpose as 'Home from school' by combining boarding status information related to each of those passengers. As another example, when 'Mom' boards the vehicle alone, the learning data unit 130 may predict the boarding purpose as 'shopping'.

The combination of the boarding status information will be described in more detail as the learning data unit 130 may extract common elements and difference elements from the boarding status information related to each of a plurality of passengers, and assign different weights to the respective elements. The learning data unit 130 may predict the boarding purpose based on the elements with the different weights assigned.

Next, the learning data unit 130 may extract at least one control information, which is to be executed in response to the predicted boarding event, from the learned information (FIG. 8, S830).

Figure 11:
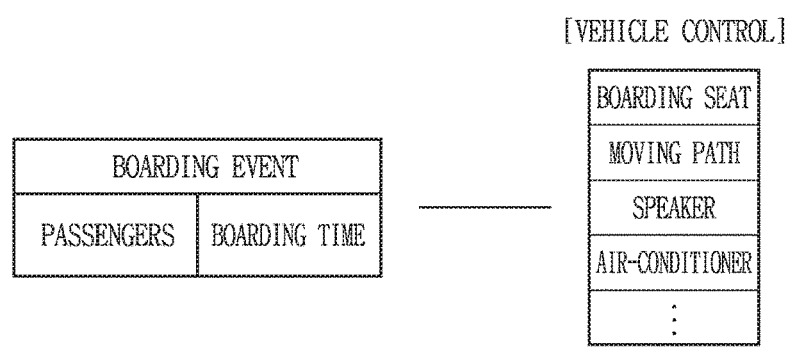

Referring now to FIG. 11, the learning data unit 130 may extract at least one control information from the boarding status information related to the passengers included in the predicted boarding event to meet the boarding purpose.

The control information related to the vehicle may include one or more of control information for executing a power train driving control, a chassis driving control, a door/window driving control, a safety device driving control, a lamp driving control, an air conditioning driving control, a vehicle driving control, a parking-out control, a parking-in control, seat control, a user interface device control, and the like. The user interface device may include an input unit, a display unit, an audio output unit and a haptic output unit, a camera, and a biometric sensing unit for receiving voice, gesture, touch, and mechanical input.

The learning data unit 130 may extract the vehicle control information from the boarding status information of the passengers included in the boarding event to meet (match) the boarding purpose. For example, the learning data unit 130 may extract at least one control information from the boarding status information related to 'Mom' when 'Mom' is included in the boarding event. Therefore, as an example, the environment of the vehicle can be created according to the passenger.

On the other hand, when a plurality of passengers are included in the predicted boarding event, the learning data unit 130 may extract control information related to seats to be used by the passengers, from the boarding status information regarding the passengers.

For example, when two passengers board the vehicle, the learning data unit 130 may predict based on the boarding status information related to the passengers that one of the passengers is to be seated in a driver seat and the other passenger is to be seated in a passenger seat or a rear seat. Then, the learning data unit 130 may extract control information related to the driver seat from the boarding status information related to the passenger expected to be seated in the driver seat, and obtain control information related to the rear seat from the boarding status information related to the passenger expected to be seated in the rear seat.

That is, the learning data unit 130 may perform a different control for each seat using the boarding status information of the passengers to be seated in the respective seats. Therefore, the learning data unit 130 can provide a vehicle environment suitable for the boarding purpose in the vicinity of the seat occupied by the passenger.

As a further feature, the controller 180 may control the vehicle based on the extracted at least one control information (FIG. 8, S840).

For instance, the learning data unit 130 may transmit the extracted control information to the controller 180 so that the vehicle environment can be created according to the predicted boarding event. The controller 180 may thus control the vehicle based on the extracted control information. The control information may be a signal or data for controlling the vehicle as described above.

Meanwhile, the learning data unit 130 may set control information for controlling the vehicle just before a boarding time included in the boarding event, so that the environment of the vehicle is created at boarding time. For example, the learning data unit 130 may include setting information set in the control information such that the vehicle is controlled just before the boarding time. In this instance, the controller 180 may control the vehicle at a time point set in the control information. As another example, the learning data unit 130 may transmit the control information to the controller 180 just before the boarding time. As such, the controller 180 may promptly control the vehicle when the control information is received. Accordingly, an internal environment of the vehicle before the passenger boards the vehicle is created.

Alternatively, the learning data unit 130 may transmit at least one control information to the controller 180 when a passenger included in the boarding event is detected through the camera 121. In this instance, vehicle environment most suitable for a passenger by controlling the vehicle at the time when the passenger actually boards the vehicle is provided.

The foregoing example relates to a method of controlling the vehicle according to the boarding event in the electronic device. Next will be described a method of controlling the vehicle according to the above control method, and reference will again be made to FIGS. 12A, 12B, and 12C.

Figures 12A, 12B, 12C:
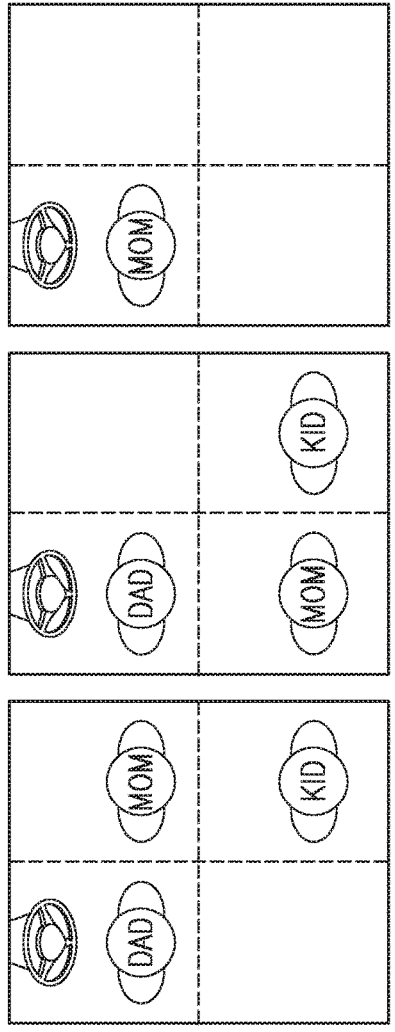

According to FIGS. 12A, 12B, 12C, the learning data unit 130 may predict a boarding event including that passengers are Dad, Mom and a kid, and a boarding time is 7:00 pm on Friday, and determine a boarding purpose of the predicted boarding event as shopping.

When the plurality of passengers are included in the predicted boarding event, the learning data unit 130 may extract control information related to seats occupied by the passengers, respectively, from board status information of each passenger.

In more detail, when Dad occupies the driver seat, the learning data unit 130 may extract control information related to the driver seat from board status information related to Dad. When Mom occupies a passenger seat, the learning data unit 130 may extract control information related to the passenger seat from boarding status information related Mom, and likewise when the kid occupies a rear seat, the learning data unit 130 may extract control information related to the rear seat from boarding status information related to the kid. Therefore, an environment optimized for each seated passenger may be achieved.

The learning data unit 130 may also extract at least one control information from a combination of boarding status information related to the plurality of passengers, in order to meet a boarding purpose. For example, the learning data unit 130 may extract control information, 'Trunk open' and 'Destination shopping center' to match 'Shopping'. Accordingly, the user is provided with a vehicle environment appropriate for the user's vehicle use purpose, even without a user's having to make a separate action.

Referring still to FIGS. 12A, 12B, 12C, when a boarding event that includes the passengers are Mom and a kid and a boarding time is 6:00 pm, then an everyday parameter is predicted and the learning data unit 130 may extract different control information from that of the previously-described boarding event. That is, different control information is extracted according to the passengers and the boarding time included in the boarding event. Therefore, various boarding events can be predicted in order to provide vehicle environments which are the most appropriate for the predicted boarding events.

Various methods of predicting boarding events and controlling the vehicle according to the boarding events has been described. Further embodiments include a method of providing boarding seat information to a plurality of passengers included in a boarding event, as will now be described.

FIGS. 13A(a), 13A(b), 13B, and 13C illustrate methods of providing passenger seat information to passengers in accordance with one embodiment of the present invention. When a boarding event including a plurality of passengers is predicted, the controller 180 may decide boarding seats to be seated by the plurality of passengers. For example, when a boarding event including persons A and B is generated, the controller 180 may set the boarding seats such that person A occupies a driver seat and person B occupies a passenger seat.

When the boarding seats of the plurality of passengers are decided, the controller 180 may provide boarding seat information to the plurality of passengers. The controller 180 may provide the boarding seat information in at least one of visible, audible or tactile manners.

The controller 180 may also output the boarding seat information through an external device capable of performing communication with the electronic device, or through an interface of the vehicle provided with the electronic device.

Referring to FIG. 13A(a), the controller 180 may transmit a message including the boarding seat information to contact information corresponding to each of the persons A and B such that persons A and B can recognize their seat locations. For example, a mobile terminal of the person B may receive notification information 1310 "The weather is cold today. The passenger seat has been heated up." Therefore, person B can recognize that the passenger seat which he or she is to be seated has been heated up. As another example, referring to FIG. 13A(b), notification information 1320 may include an image 1330 indicating locations to be seated by the passengers. Therefore, the passengers can recognize the seat information through smart phones belonging to the passengers, respectively.

Figure 13B:
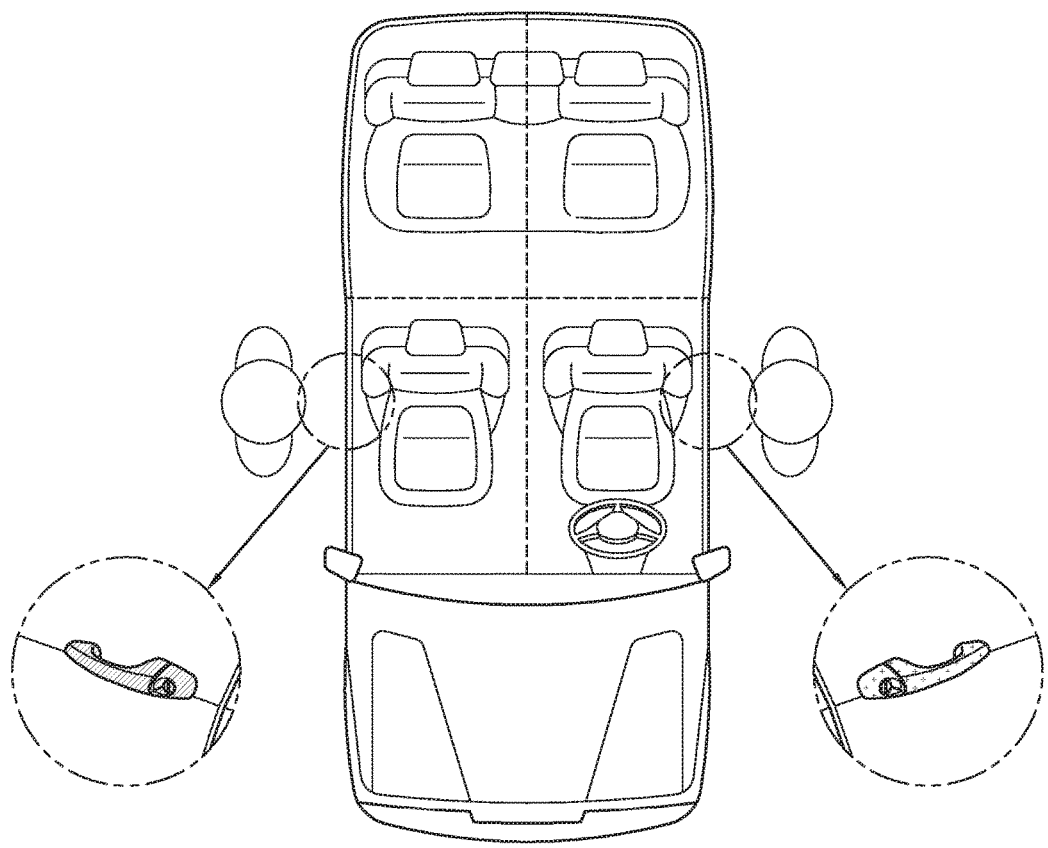
FIGS. 13A(a), 13A(b), 13B, and 13C illustrate methods of providing passenger seat information to passengers in accordance with one embodiment of the present invention.

As another example, as illustrated in FIG. 13B, the controller 180 may output light through a light output unit (e.g., LED output unit) provided on a door handle of the vehicle corresponding to the decided seat information. In this example, the light output unit provided on each door handle may output light of a different color preset for each passenger. Therefore, the passengers can intuitively recognize the locations to be seated according to the different colors of light.

Figure 13C:
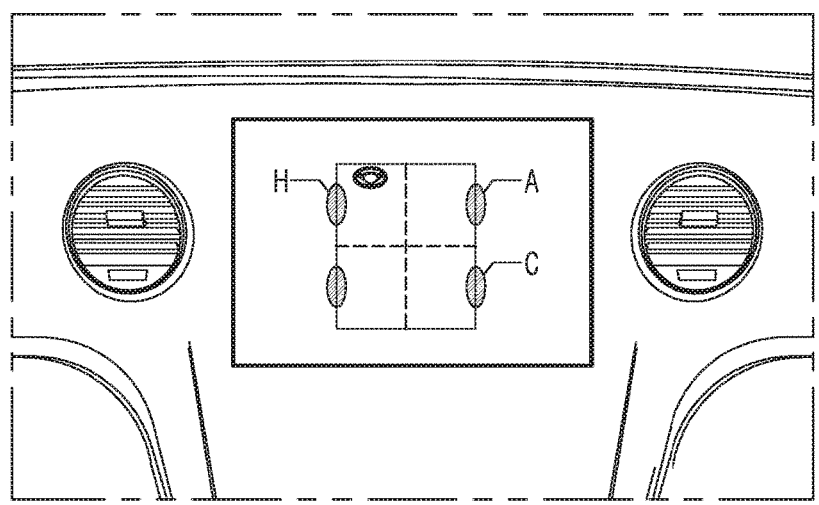

As another example, as illustrated in FIG. 13C, the controller 180 may visually output the decided seat information on a display unit (e.g., HUD) provided in the vehicle.

The method of transmitting the notification information illustrated in FIGS. 13B and 13C can be implemented when there is no contact information corresponding to each passenger.

A method of providing the boarding seat information has been described. Such information can guide the passengers to their respective seats with the appropriate environment created for each respective passenger.

FIGS. 14A(a), 14A(b), 14A(c), 14B(a), 14B(b), 14B(c) illustrate methods of predicting passengers included in a boarding event. In particular, the learning data unit 130 may receive message contents from an external device and analyze these contents based on a conversation analysis algorithm. The conversation analysis algorithm can use the previously-known algorithm, so detailed description thereof will be omitted.

Referring to FIG. 14A(a), the learning data unit 130 may predict a boarding event based on the analysis result. For example, as illustrated in FIG. 14A(b), the learning data unit 130 may predict the boarding event indicating that passengers are a user (Me), and persons A and B and a boarding time is 2:10 pm.

The learning data unit 130 may generate boarding seat information related to the plurality of passengers based on a combination of boarding status information of each of the passengers. The boarding status information may include analysis information of the message contents. In this example, the learning data unit 130 may generate the boarding seat information related to the passengers by assigning a higher weight to the latest information when the analysis information of the message contents includes the latest information.

For example, the learning data unit 130 may generate the boarding seat information indicating that the user is seated in a driver seat, person A is seated in a passenger seat and person B is seated in the rear seat, based on pre-learned boarding seat information. In this instance, when body-related information that B has a bad back is extracted from the analysis information on the message contents, since the body-related information is the latest information, the learning data unit 130 may change the generated boarding seat information by assigning a higher weight. That is, the learning data unit 130 may change the boarding seat information to indicate that the user is seated in the driver seat, person A is seated in the rear seat and person B is seated in the passenger seat. Accordingly, optimal seat arrangement can be set by considering not only information related to seats that the passengers have been seated before but also a current health condition.

The learning data unit 130 may also detect passengers to be included in a boarding event based on surrounding image information of the vehicle. For example, as illustrated in FIG. 14B(a), the learning data unit 130 may detect 'Me', 'A' and 'B' as passengers based on an image captured through the camera. In this instance, as illustrated in FIG. 14B(b), the learning data unit 130 may predict the boarding event that the passengers are 'Me', 'A' and 'B' and a boarding time is now.

The learning data unit 130 may extract body-related information (e.g., height, body type) regarding each passenger from the passenger-captured image. In this instance, the learning data unit 130 may generate boarding seat information by assigning a higher weight to the body-related information extracted from the image. For example, the learning data unit 130 may arrange 'A' who is big in the passenger seat, and 'B' who is small in the rear seat by considering the body-related information.

The learning data unit 130 may also detect a passenger, whose boarding status information is not provided, among passengers detected from a passengers-captured image. That is, the learning data unit 130 may detect a passenger who has no previous history of boarding the vehicle from this image. In this example, the learning data unit 130 may generate boarding seat information by considering the body-related information, such as gender, age, height, body shape and the like extracted from the image.

A method has been described in which passengers included in the boarding event are recognized by the electronic device. Another embodiment is depicted in FIGS.

15A, 15B, 15C, which illustrate a method of reproducing content while driving a vehicle with a plurality of passengers seated.

The learning data unit 130 may reproduce a content through an audio system provided in the vehicle while the vehicle with the passengers is driven. Here, the content may be a sound source, a video and the like. The learning data unit 130 may calculate content occupancy rates of the passengers by comparing boarding status information of each of the passengers with attribute information of the content currently reproduced in the vehicle. In detail, the learning data unit 130 may set high content occupancy rate to a passenger whose boarding status information includes content reproduction tendency information which is the same as the attribute information on the content currently reproduced in the vehicle. For example, when a sound source of a genre 'Love' is currently reproduced, the learning data unit 130 may set the occupancy rate of a passenger whose boarding status information includes sound source information of the genre 'love' to be higher than those of the other passengers.

Figure 15A:
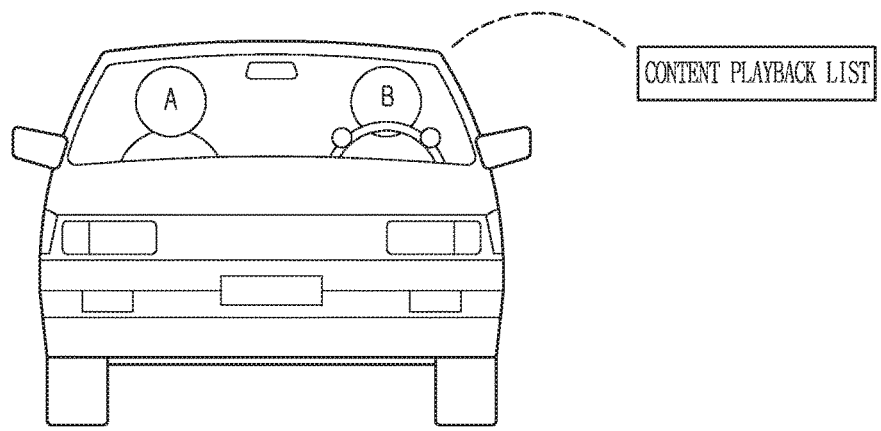
FIGS. 15A, 15B, 15C illustrate a method of reproducing content while driving a vehicle with a plurality of passengers seated.
Figure 15B:
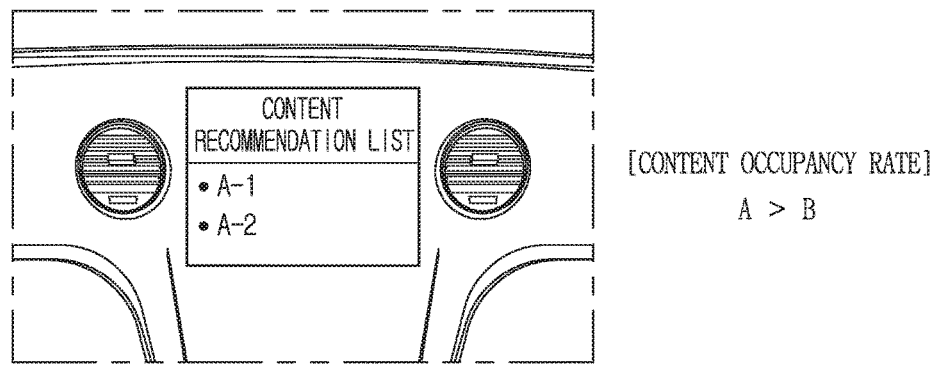

In this instance, the learning data unit 130 may provide a preferred sound source of a passenger with a high content occupancy rate, as a recommended sound source. For example, as illustrated in FIGS. 15A, 15B, when a content occupancy rate of a person A is higher than that of a person B in a state in which the persons A and B have boarded the vehicle, the learning data unit 130 may provide A-preferred sound sources A-1 and A-2 as the recommended sound sources. The A-preferred sound sources may be the sound source information received from a mobile terminal belonging to the person A or may be a sound source extracted on an external server according to the tendency of person A.

Figure 15C:
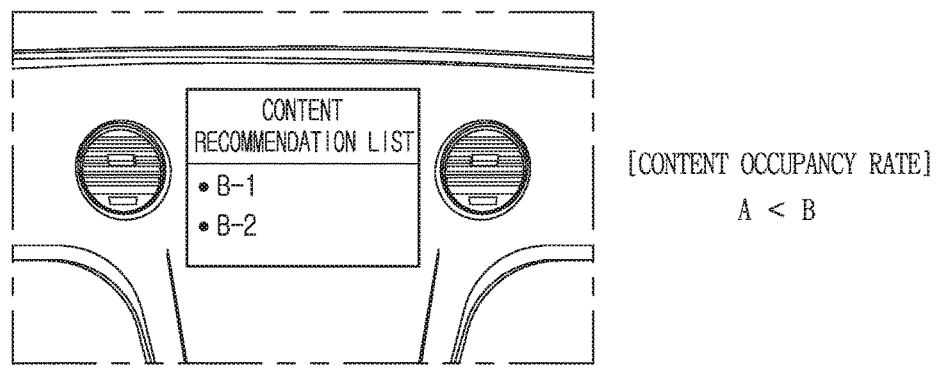

Similarly, as illustrated in FIGS. 15A, 15C, the learning data unit 130 may provide sound sources B-1 and B-2 as recommended sound sources when the content occupancy rate of the person B is higher than the content occupancy rate of the person A.

FIGS. 16A(a), 16A(b), 16B(a), 16B(b) illustrate methods of controlling an environment of a vehicle during driving of the vehicle. In particular, these figures depict methods of controlling an environment of a vehicle according to boarding status information regarding a user while driving the vehicle The learning data unit 130 may detect boarding status information regarding a plurality of users (passengers) seated in the vehicle while the vehicle is driven. The learning data unit 130 may control a surrounding environment of a seat occupied by each passenger based on the boarding status information regarding each passenger.

For example, as illustrated in FIG. 16A(a), the learning data unit 130 may detect that a passenger seated in a rear seat is in a sleeping state. In this instance, as illustrated in in FIG. 16A(b), the learning data unit 130 may minimize a volume of a speaker so that a sound source is not output through a speaker arranged at the rear seat.

As another example, as illustrated in FIG. 16B(a), the learning data unit 130 may detect that a passenger seated in the rear seat is in a call-conversation state (e.g., talking on the phone). In this instance, as illustrated in FIG. 16B(b), the learning data unit 130 may minimize a volume of a speaker arranged at the rear seat, and execute a noise canceling function such that a call sound is not heard by other passengers seated in the driver seat and the passenger seat. Thus, an optimal seat environment for each seat is provided based on the boarding information on the passengers while the vehicle is driven or is otherwise occupied.

The foregoing description has been given of the method of controlling the environment of the vehicle according to the boarding status information involved in the passengers while driving the vehicle.

FIGS. 17A(a), 17A(b), 17A(c), 17B(a), 17B(b), 17B(c) illustrate embodiments of controlling a vehicle when an error occurs in prediction of a boarding event. The learning data unit 130 may predict a boarding event and control the vehicle according to the predicted boarding event. On the other hand, the learning data unit 130 may detect an occurrence of another event different from the boarding event at a time point when it is predicted that a boarding event is to occur. For example, as illustrated in FIG. 17A(a), 17A(b), the learning data unit 130 may recognize another boarding event, which indicates that passengers different from passengers included in the boarding event board the vehicle, at a boarding time included in the boarding event.

In this example, the learning data unit 130 may re-recognize a boarding event. More specifically, the learning data unit 130 may generate a new boarding event that includes currently-boarded passengers and each boarding time. Then, the learning data unit 130 may infer a boarding purpose for the new boarding event and extract at least one control information from boarding status information on the newly-boarded passenger to meet the inferred boarding purpose. Thereafter, the learning data unit 130 may perform a control of the vehicle according to the extracted at least one control information.

An example of a vehicle control method according to an addition or exclusion of passengers will be now be described. As illustrated in FIG. 17A(a), 17(c), when several passengers of a plurality of expected passengers do not board the vehicle, the learning data unit 130 may control the controller 180 to not execute the vehicle control according to control information related to the several passengers. In this example, the learning data unit 130 may execute a vehicle control based on control information related to the boarded passengers.

Alternatively, as illustrated in FIG. 17B(a), 17B(c), the learning data unit 130 may detect a newly-boarded passenger in addition to passengers included in a boarding event. In this example, the learning data unit 130 may set boarding seat information from boarding status information regarding the new passenger, and extract control information related to the boarding seat.

As another alternative, although not illustrated, the learning data unit 130 may detect a newly-boarded passenger other than passengers included in a boarding event. In this example, the learning data unit 130 may determine that it is a dangerous situation, and output notification information informing the dangerous situation in a preset manner. The output method of the notification information may be similar to that illustrated in FIGS. 13A(a), 13A(b), and 13B.

When a plurality of passengers board a vehicle, environmental information optimized for each passenger can be provided, thereby improving boarding convenience of the passengers. In addition, by predicting passengers of a vehicle through various information, the environment of the vehicle can be preset even without a separate user control command. Thus, the user can be provided with an environment optimized for him or her when the user gets in the vehicle.

Embodiments of the present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device, comprising:
a communication unit configured to communicate with an external device; and
a controller configured to:
obtain conversation information between the electronic device and the external device through the communication unit;
analyze the conversation based on a learning algorithm;
identify a predicted plurality of users to be located in a specific space at a specific time based on a result of the analyzed conversation, wherein the plurality of users include a first user of the electronic device and a second user of the external device;
predict a use purpose of the specific space by the plurality of users at the specific time based on characteristic information of each of the plurality of users and the analyzed conversation;
transmit, via the communication unit, notification information related to the specific space to each of a plurality of devices corresponding to the plurality of users to guide the plurality of users to the specific space at the specific time, wherein the notification information is transmitted to each of the plurality of devices at a different time based on a respective location of each of the plurality of users and a location of the specific space; and
generate a control command for a device associated with the specific space at the specific time to function according to the predicted use purpose of the specific space.

2. The electronic device of claim 1, wherein the controller is further configured to:
identify a present plurality of people located within the specific space at the specific time, wherein the present plurality of people does not match the predicted plurality of users; and
determine a new use purpose of the specific space based at least on characteristic information of additional persons who are present that were not included in the predicted plurality of users.

3. The electronic device of claim 2, wherein the controller is further configured to identify the predicted plurality of users to be located within the specific space according to a message received from the external device through the communication unit.

4. The electronic device of claim 3, wherein the controller is further configured to:
receive, via the communication unit, a plurality of schedule information from the plurality of electronic devices through the communication unit, and
generate schedule information related to the specific space based on the received plurality of schedule information.

5. The electronic device of claim 4, wherein the controller is further configured to:
generate the control command based on the characteristic information related to each of the predicted plurality of users and the generated schedule information related to the specific space.

6. The electronic device of claim 2, further comprising a camera configured to capture an image of the specific space, wherein the controller is further configured to:
identifying each of the present plurality of people located within the specific space based on the captured image.

7. The electronic device of claim 1, wherein the predicted use purpose is among a plurality of different use purposes, each having a different control command for the at least one device.

8. The electronic device of claim 1, wherein the controller is further configured to extract common elements from the characteristic information related to each of the predicted plurality of users, wherein the use purpose is predicted based on the extracted common elements.

9. The electronic device of claim 1, further comprising a memory, wherein the controller is further configured to:
learn the characteristic information related to each of the plurality of users; and
store in the memory, the learned characteristic information related to each of the plurality of users.

10. The electronic device of claim 1, wherein the characteristic information related to each of the plurality of users comprises at least one of biometric information, behavior information, history information related to the specific space, or companion information of persons located together within the specific space.

11. The electronic device of claim 1, wherein the device is located at the specific space.

12. The electronic device of claim 1, wherein the control command is generated according to a combination of the characteristic information related to each of the predicted plurality of users.

13. An electronic device for assisting in operation of a vehicle, the electronic device comprising:
a communication unit configured to communicate with an external device,
a controller configured to:
obtain information transmitted between the electronic device and the external device through the communication unit;
analyze the transmitted information based on a learning algorithm;
identify a predicted plurality of passengers to board the vehicle based on a result of the analyzed transmitted information, wherein the plurality of passengers include a first user of the electronic device and a second user of the external device;
predict a purpose of a trip of the vehicle based on characteristic information of each of the plurality of passengers and the analyzed transmitted information;
transmit, via the communication unit, notification information related to boarding the vehicle to each of a plurality of devices corresponding to the predicted plurality of passengers to guide the plurality of passengers in boarding the vehicle; and
generate a control command for an aspect of the vehicle to function according to the predicted purpose.

14. The electronic device of claim 13, wherein the controller is further configured to:
  identify a present plurality of passengers who have boarded the vehicle, wherein the present plurality of passengers does not match the predicted plurality of passengers; and
  determine a new purpose of the trip based at least on characteristic information of additional persons who are present that were not included in the predicted plurality of users.

15. The electronic device of claim 13, wherein the controller is further configured to:
  set seat designations for each of the predicted plurality of passengers prior to boarding; and
  generate a control command for adjusting a setting associated with a seat based on a detected state of a particular passenger of the predicted plurality of passengers designated to the seat.

16. The electronic device of claim 13, wherein the controller is further configured to:
  set seat designations for each of the predicted plurality of passengers prior to boarding; and
  generate a control command for the vehicle to output indicators of the seat designations prior to boarding.

* * * * *